(12) United States Patent
Jinnai et al.

(10) Patent No.: US 10,053,047 B2
(45) Date of Patent: Aug. 21, 2018

(54) AIRBAG

(71) Applicant: TOYODA GOSEI CO., LTD., Kiyosu-shi, Aichi-ken (JP)

(72) Inventors: Ryosuke Jinnai, Kiyosu (JP); Naoki Hotta, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 0 days.

(21) Appl. No.: 15/233,239

(22) Filed: Aug. 10, 2016

(65) Prior Publication Data

US 2017/0057451 A1 Mar. 2, 2017

(30) Foreign Application Priority Data

Sep. 1, 2015 (JP) .................................. 2015-172173

(51) Int. Cl.
*B60R 21/217* (2011.01)
*B60R 21/261* (2011.01)
*B60R 21/262* (2011.01)

(52) U.S. Cl.
CPC ........ *B60R 21/2171* (2013.01); *B60R 21/261* (2013.01); *B60R 21/262* (2013.01)

(58) Field of Classification Search
CPC . B60R 21/2171; B60R 21/261; B60R 21/262; B60R 2021/2178; B60R 2021/2617
See application file for complete search history.

(56) References Cited

U.S. PATENT DOCUMENTS

| | | | | |
|---|---|---|---|---|
| 6,073,961 A * | 6/2000 | Bailey | .................. | B60R 21/232 280/729 |
| 6,082,761 A * | 7/2000 | Kato | ..................... | B60R 21/213 280/728.2 |
| 6,224,089 B1 * | 5/2001 | Uchiyama | ............... | B60R 21/23 280/728.2 |
| 6,293,581 B1 * | 9/2001 | Saita | ..................... | B60R 21/213 280/730.2 |
| 6,312,010 B1 * | 11/2001 | Heigl | .................... | B60R 21/232 280/728.1 |
| 6,343,811 B1 * | 2/2002 | Hammer | ............... | B60R 21/232 280/730.2 |
| 6,565,118 B2 * | 5/2003 | Bakhsh | ................. | B60R 21/232 280/730.2 |

(Continued)

FOREIGN PATENT DOCUMENTS

JP 2015-063251 A 4/2015

*Primary Examiner* — Paul N Dickson
*Assistant Examiner* — Timothy Wilhelm
(74) *Attorney, Agent, or Firm* — Posz Law Group, PLC

(57) ABSTRACT

An air bag includes an air bag main body and a guide member. The air bag main body includes an expansion portion that expands with expansion gas flowing from an inflator and a tubular connecting port, which is connected to the inflator by inserting a side of a gas outlet port of the inflator thereinto, to cause the expansion gas to flow into the expansion portion, and is formed of a sheet material with flexibility so as to be able to be folded. The guide member has a shape holding property of maintaining an opening state of the connecting port so as to be able to be attached to the connecting port of the air bag main body and guide the insertion of the inflator into the side of the gas outlet port.

14 Claims, 21 Drawing Sheets

(56) References Cited

U.S. PATENT DOCUMENTS

| | | | |
|---|---|---|---|
| 6,616,179 B2* | 9/2003 | Tanase | B60R 21/232 280/730.2 |
| 6,746,046 B2* | 6/2004 | Rink | B60R 21/26 137/68.13 |
| 6,811,184 B2* | 11/2004 | Ikeda | B60R 21/232 280/730.2 |
| 6,860,506 B2* | 3/2005 | Ogata | B60R 21/232 280/728.2 |
| 6,959,649 B2* | 11/2005 | Katsuda | B60R 21/261 102/530 |
| 7,040,652 B2* | 5/2006 | Ogata | B60R 21/232 280/730.2 |
| 7,140,639 B2* | 11/2006 | Hayashi | B60R 21/2171 280/742 |
| 7,243,941 B2* | 7/2007 | Charpentier | B60R 21/232 280/729 |
| 7,278,659 B2* | 10/2007 | Takahara | B60R 21/232 280/728.1 |
| 7,530,598 B2* | 5/2009 | Fischer | B60R 21/23 280/742 |
| 7,600,778 B2* | 10/2009 | Schang | B60R 21/232 280/730.2 |
| 7,631,908 B2* | 12/2009 | Meier | B60R 21/2171 24/20 CW |
| 7,654,566 B2* | 2/2010 | Huber | B60R 21/26 280/736 |
| 7,762,575 B2* | 7/2010 | Jang | B60R 21/232 280/729 |
| 7,900,957 B2* | 3/2011 | Honda | B60R 21/23138 280/729 |
| 7,938,436 B2* | 5/2011 | Lunt | B60R 21/2171 280/728.2 |
| 7,938,443 B1* | 5/2011 | Smith | B60R 21/261 280/736 |
| 8,006,999 B2* | 8/2011 | Suemitsu | B60R 21/2346 280/728.2 |
| 8,007,000 B2* | 8/2011 | Gammill | B60R 21/232 280/730.2 |
| 8,007,003 B2* | 8/2011 | Kalandek | B60R 21/2171 280/740 |
| 8,196,952 B2* | 6/2012 | Walston | B60R 21/2171 280/728.2 |
| 8,215,664 B2* | 7/2012 | Arima | B60R 21/26 280/728.2 |
| 8,226,117 B2* | 7/2012 | Honold | B60R 21/2171 280/728.2 |
| 8,448,984 B2* | 5/2013 | Azuma | B60R 21/232 280/730.2 |
| 8,567,817 B2* | 10/2013 | Yamamoto | B60R 21/23138 280/729 |
| 8,622,423 B1* | 1/2014 | Manire | B60R 21/2171 280/730.2 |
| 8,684,399 B2* | 4/2014 | Honda | B60R 21/2171 280/728.2 |
| 8,764,050 B2* | 7/2014 | Baumgartner | B60R 21/2171 280/728.2 |
| 8,770,618 B2* | 7/2014 | Fukawatase | B60R 21/232 280/729 |
| 8,820,779 B1* | 9/2014 | Low | B60R 21/232 280/728.2 |
| 8,876,155 B2* | 11/2014 | Nakashima | B60R 21/232 280/729 |
| 9,061,652 B2* | 6/2015 | Acker | B60R 21/261 |
| 9,067,562 B2* | 6/2015 | Nakashima | B60R 21/232 |
| 9,352,719 B2* | 5/2016 | Nakamura | B60R 21/235 |
| 9,511,737 B2* | 12/2016 | Cho | B60R 21/213 |
| 9,566,933 B2* | 2/2017 | Jinnai | B60R 21/2346 |
| 9,610,916 B2* | 4/2017 | Kawamura | B60R 21/232 |
| 2002/0105174 A1* | 8/2002 | Tanase | B60R 21/232 280/730.2 |
| 2002/0175508 A1* | 11/2002 | Hess | B60R 21/26 280/740 |
| 2003/0141710 A1* | 7/2003 | Zahn | B60R 21/30 280/742 |
| 2003/0168841 A1* | 9/2003 | Goto | B60R 21/261 280/740 |
| 2004/0104563 A1* | 6/2004 | Fischer | B60R 21/232 280/743.1 |
| 2005/0134022 A1* | 6/2005 | Noguchi | B60R 21/2171 280/728.2 |
| 2006/0108778 A1* | 5/2006 | Ochiai | B60R 21/232 280/730.2 |
| 2007/0052212 A1* | 3/2007 | Powals | B60R 21/232 280/729 |
| 2007/0063489 A1* | 3/2007 | Dinsdale | B60R 21/26 280/728.2 |
| 2008/0079246 A1* | 4/2008 | Dix | B60R 21/232 280/730.2 |
| 2008/0111357 A1* | 5/2008 | Heninger | B60R 21/2171 280/740 |
| 2008/0238055 A1* | 10/2008 | Hotta | B60R 21/213 280/730.2 |
| 2009/0026742 A1* | 1/2009 | Noguchi | B60R 21/232 280/730.2 |
| 2010/0013203 A1* | 1/2010 | Mitchell | B60R 21/232 280/743.2 |
| 2010/0207368 A1* | 8/2010 | Weyrich | B60R 21/237 280/736 |
| 2011/0025023 A1* | 2/2011 | Hatfield | B60R 21/2171 280/728.2 |
| 2014/0217707 A1* | 8/2014 | Konishi | B60R 21/213 280/728.2 |
| 2015/0151708 A1* | 6/2015 | Kawamura | B60R 21/232 280/728.2 |

\* cited by examiner

Fig. 10
(A)
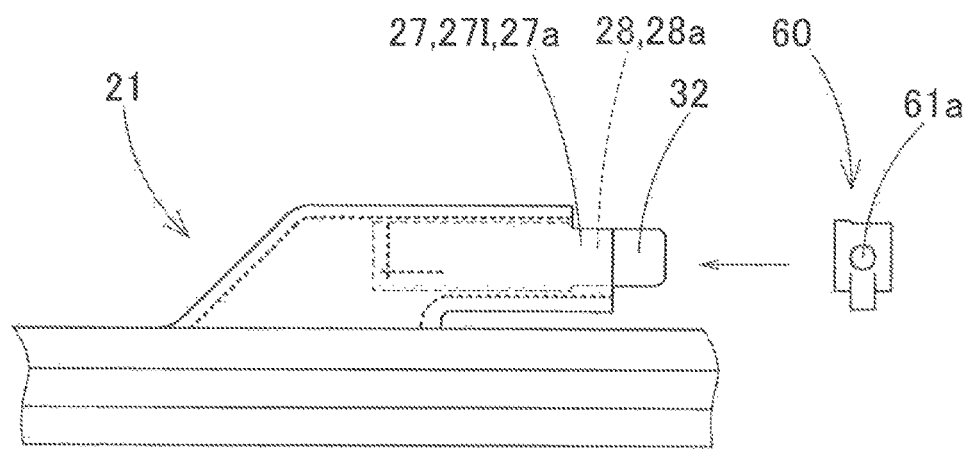
(B)
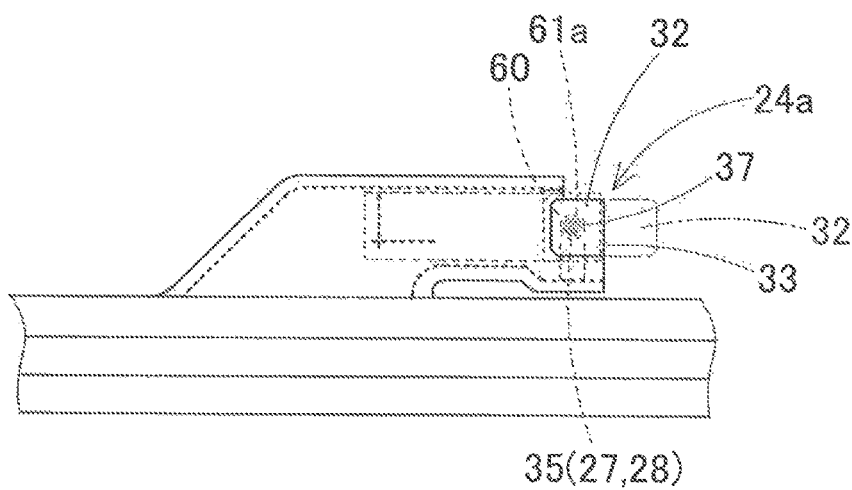

Fig. 11
(A)
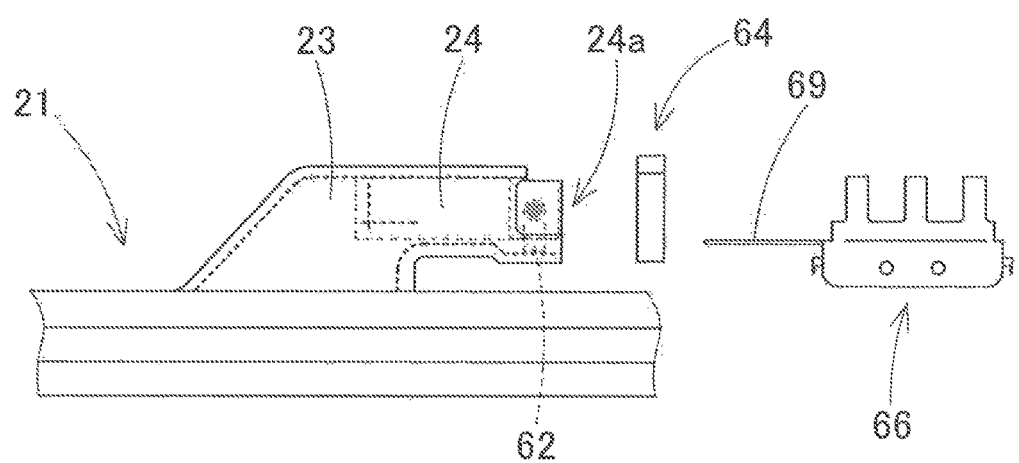
(B)
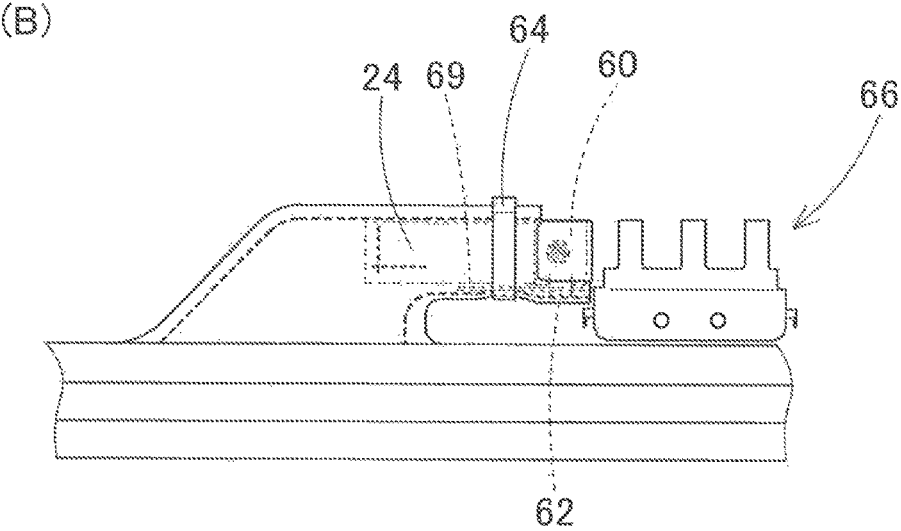

Fig. 12
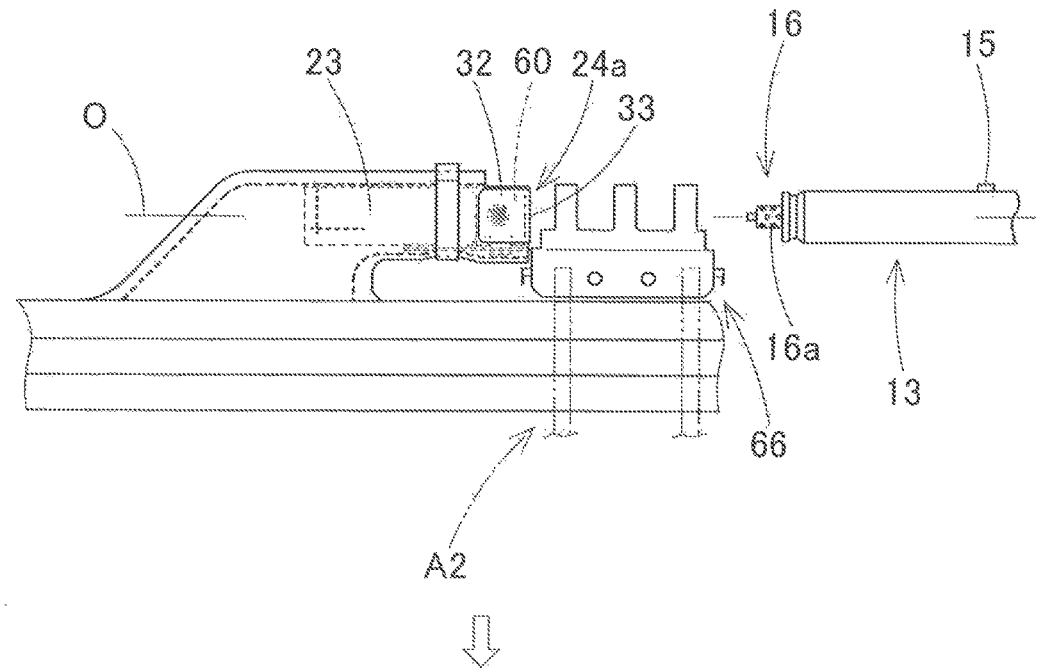
(A)
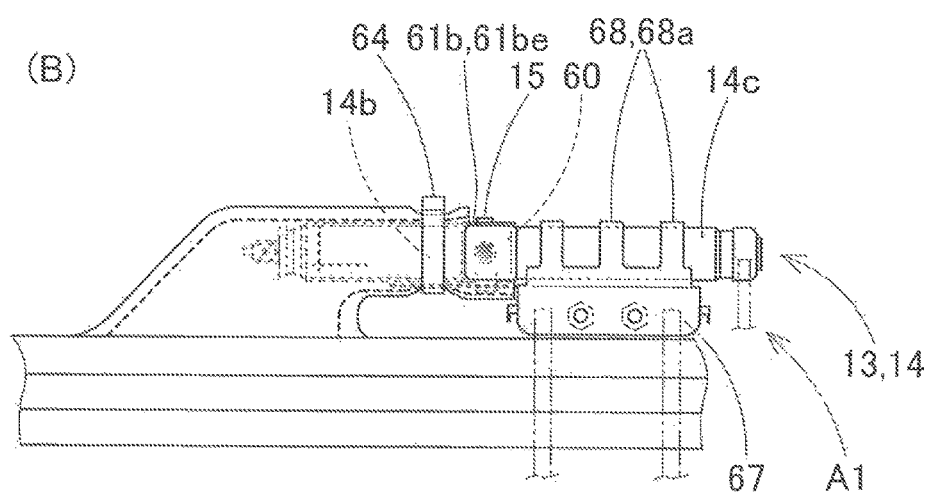
(B)

Fig. 13
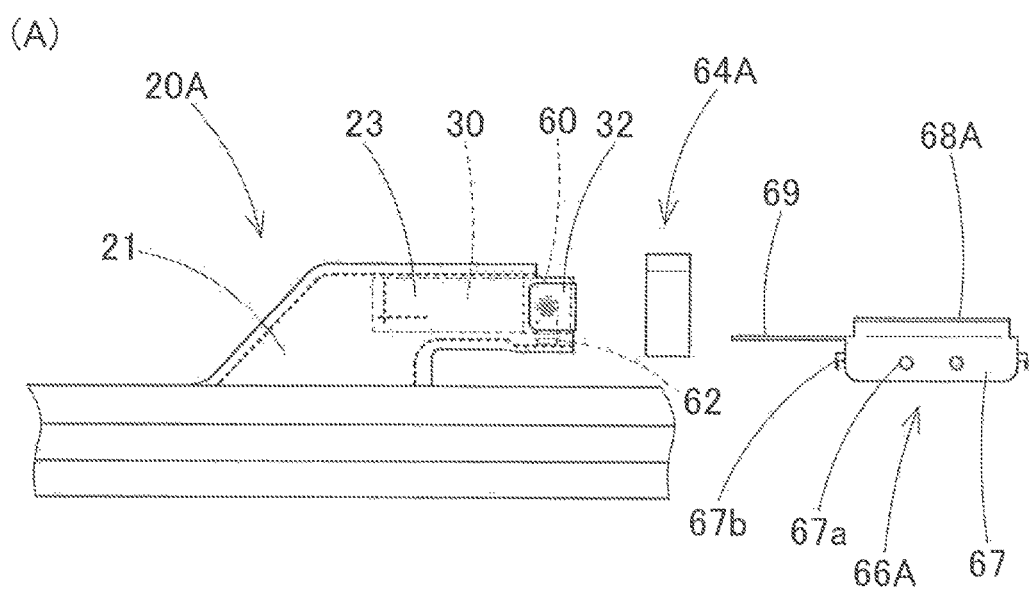
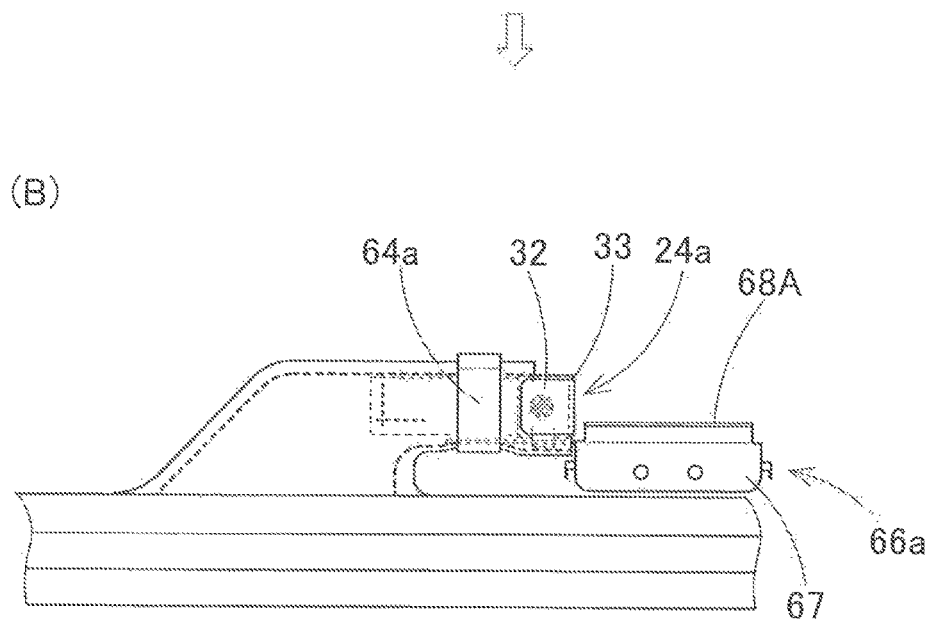

Fig. 14
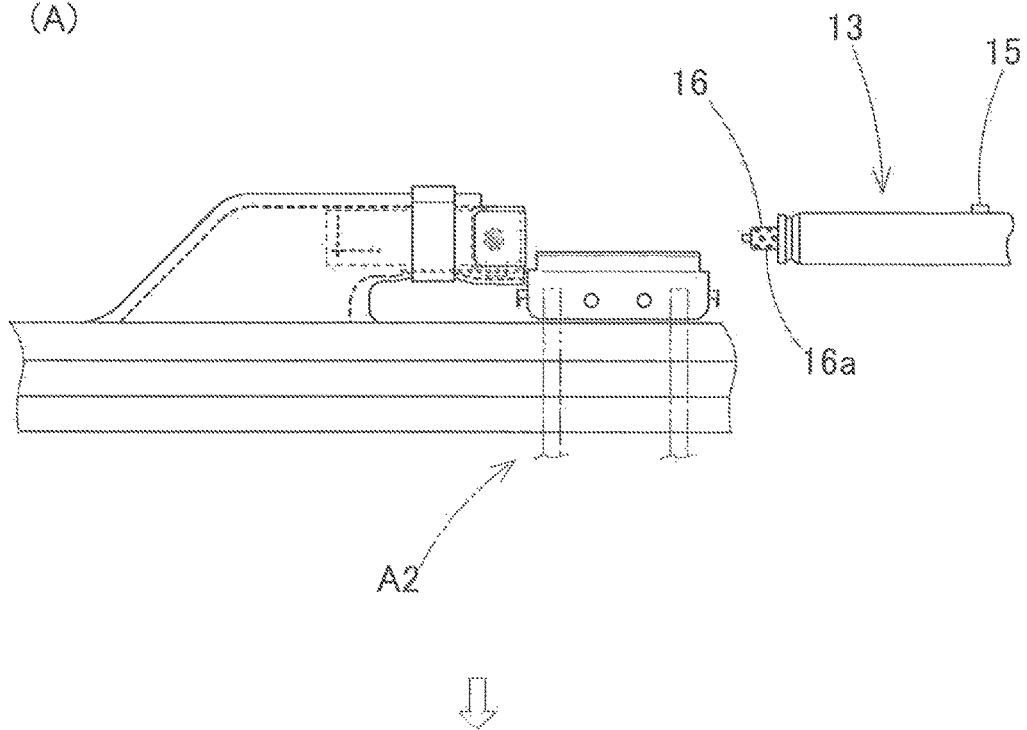
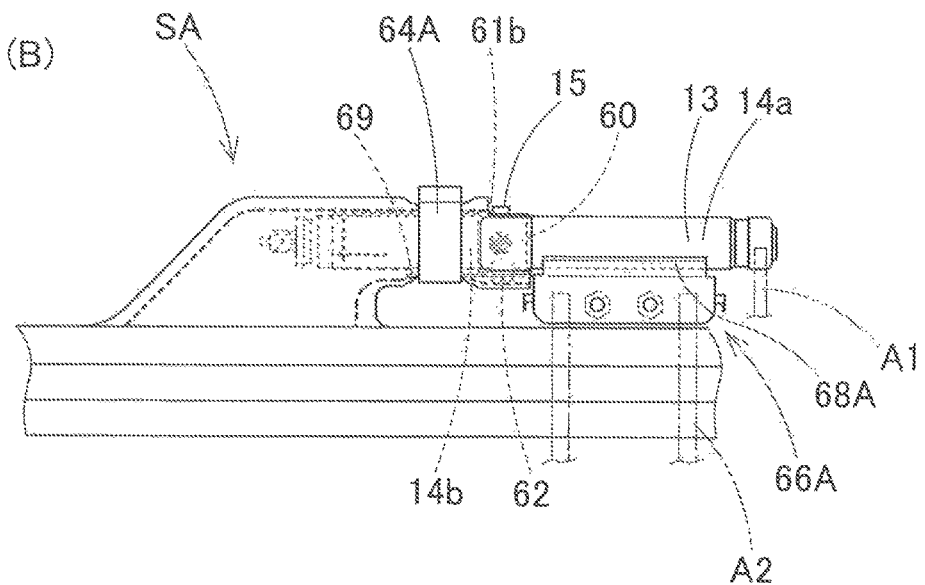

Fig. 16
(A)
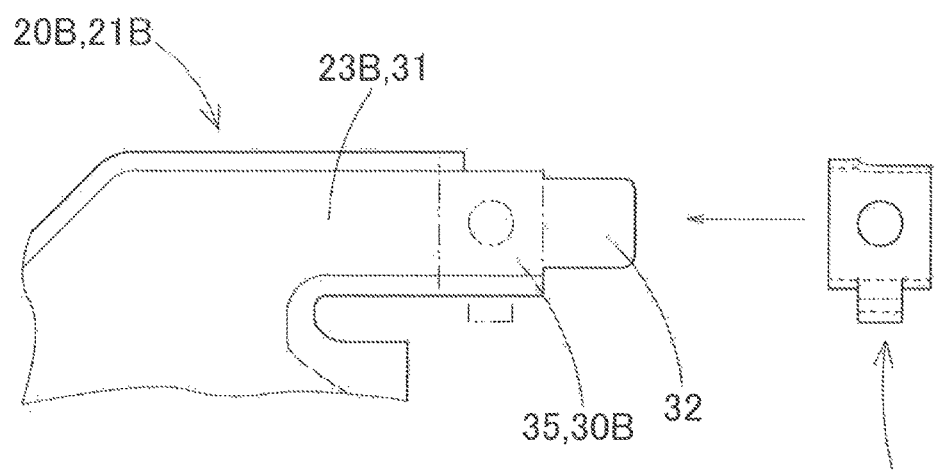
(B)
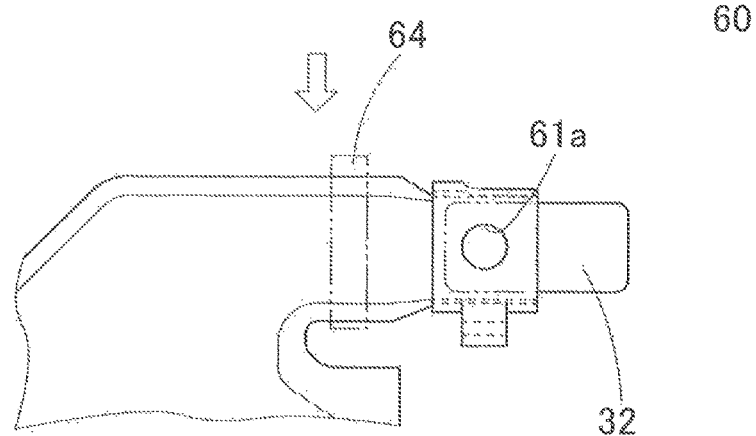
(C)
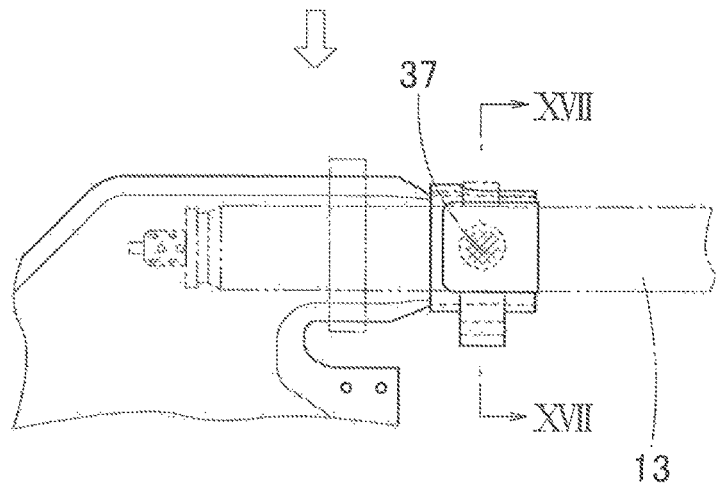

Sectional view at XVIII-XVIII

Sectional view at XIX-XIX

AIRBAG

CROSS REFERENCE TO RELATED APPLICATIONS

The present application claims priority from Japanese Patent Application No. 2015-172173 of Jinnai et al., filed on Sep. 1, 2015, the entire disclosure of which is incorporated herein by reference.

BACKGROUND OF THE INVENTION

Field of the Invention

The present invention relates to an air bag that is mounted on a vehicle and expands with expansion gas flowing from a substantially columnar inflator.

Background Art

In the related art, an air bag to which a substantially columnar inflator is connected includes an expansion portion that expands with expansion gas flowing from the inflator and a tubular connecting port, which is connected to the inflator by inserting a side of a gas outlet port of the inflator thereinto, to cause the expansion gas to flow into the expansion portion, and is formed of a sheet material with flexibility so as to be able to be folded (see JP-A-2015-063251). The sheet material is formed of a cloth material obtained by plain-weaving yarns made of polyester or polyamide, for example. A reinforcing cloth for enhancing heat resistance is appropriately disposed at the connecting port.

However, since the connecting port, into which the inflator is inserted, is formed of the sheet material (cloth material) with flexibility even if the reinforcing cloth is disposed, an operator manually and separately widens the opening portion of the connecting port when the inflator is inserted in the case of the air bag in the related art. Therefore, insertion of the inflator into the connecting port requires time and effort, and the air bag in the related art has a problem in the operation of inserting the inflator into the connecting port.

Furthermore, according to the air bag in the related art, there is a process of packing the air bag on site after fabrication, then moving the air bag, and connecting the inflator to the connecting port at a different place. In addition, at is not possible to assemble a large number of inflators to air bags at the same time due to management of the inflators, for example. In consideration of efficiency of assembly, it is desired to automatically assemble the inflator to the air bag in the related art.

SUMMARY OF THE INVENTION

The invention was made for solving the aforementioned problem, and an object thereof is to provide an air bag that enables easy insertion of an inflator into a connecting port and enables automatic assembly of the inflator.

An air bag according to the invention includes: an air bag main body that includes an expansion portion that expands with expansion gas flowing from the inflator, and a tubular connecting port, which is connected to the inflator by inserting a side of a gas outlet port of the inflator thereinto, to cause the expansion gas to flow into the expansion portion, and that is formed of a sheet material with flexibility so as to be able to be folded; and a guide member that has a shape holding property and is attached to the connecting port of the air bag main body and maintains an opening state of the connecting port so as to be able to guide the insertion of a side of the gas outlet port of the inflator.

In the air bag according to the invention, the tubular guide member with the shape holding property of maintaining the opening state of the connecting port so as to be able to guide the insertion of the side of the gas outlet port of the inflator is disposed at the part corresponding to the connecting port of the air bag main body. Therefore, it is possible to insert the inflator into the connecting port without being trapped by merely moving the inflator from the side of the gas outlet port to the opening of the connecting port along a direction orthogonal to the opening.

Therefore, the air bag according to the invention facilitates insertion of the inflator into the connecting port and automatic assembly of the inflator.

In the air bag according to the invention, it is preferable that the guide member is formed into a tubular shape.

Although an O-ring-shaped guide member or a C-ring-shaped guide member is also applicable as long as the opening shape of the connecting port can be maintained, the tubular guide member can stabilize an insertion direction of the inflator into the connecting port along an axial direction of the tubular shape of the guide member and enables quick insertion of the inflator into the connecting port.

In the air bag according to the invention with the configuration in which the guide member has a tubular shape, it is preferable that the guide member includes an attachment hole that penetrates through inner and outer circumferences, that the connecting port of the air bag main body includes an attachment sheet portion that covers the attachment hole and a circumferential edge of the attachment hole on an outer circumferential side or an inner circumferential side of the guide member, that the attachment sheet portion includes a welded portion that is welded to the sheet material, which the attachment sheet portion faces with the attachment hole interposed therebetween, which forms the connecting port, through the attachment hole and that the guide member is attached to the connecting port with the welded portion.

With such a configuration, it is possible to attach the guide member to the connecting port by merely mutually welding the attachment sheet portion and the sheet material forming the connecting port through the attachment hole of the guide member, and to facilitate the attachment of the guide member.

In this case, it is possible to more stably attach the guide member to the connecting port, to suppress deviation of a sheet portion (a sheet material forming the attachment sheet portion or the connecting port) that is brought into contact with the inflator during the insertion of the inflator, and realize more stable and quick insertion of the inflator if a plurality of attachment holes are formed in the guide member such that a plurality of welded portions are disposed around an axial center of the guide member so as to be separate from each other.

In the air bag according to the invention, it is preferable that the attachment sheet portion is disposed with a folded portion provided on a side of an opening end of the connecting port so as to cover the inner circumferential side and the outer circumferential side of the guide member, and that the welded portion couples portions of the guide member on the inner circumferential side and the outer circumferential side at the attachment sheet portion.

With such a configuration, the folded portion of the attachment sheet portion covers the circumferential edge of the opening of the connecting port and can prevent the inflator from entering between the guide member on the inner circumferential side of the guide member and the part corresponding to the sheet material of the connecting port or the attachment sheet portion, and to thereby realize further smooth and quick insertion of the inflator into the connecting port. If the inflator enters between the guide member and the part corresponding to the sheet material of the connecting port or the attachment sheet portion on the inner circumferential side of the guide member, the part corresponding to the sheet material of the connecting port or the attachment sheet portion is turned up on the inner circumferential side of the guide member, for example, due to an inappropriate entrance position of the inflator, which blocks the side of the inner circumference of the guide member and stops the entrance of the inflator. Eventually, it is necessary to pull out the inflator and perform the operation of connecting the inflator to the connecting port again.

Furthermore, in the air bag according to the invention, it is preferable that the guide member includes a position restriction portion that restricts a position of an inflator positioning portion when the inflator is inserted into the connecting port and defines an insertion position of the inflator.

If the position restriction portion of the guide member restricts the position of the inflator positioning portion during the insertion of the inflator into the connecting port in such a configuration, the inflator is inserted into an appropriate position relative to the connecting port. Therefore, it is possible to quickly and smoothly perform the operation of inserting the inflator into the connecting port.

In the air bag according to the invention, it is preferable that a bracket to be attached on a side of a vehicle body is assembled with the guide member.

With such a configuration, the connecting port of the air bag provided with the guide member includes, in advance, the bracket which can be assembled with the guide member and can be attached to the side of the vehicle body. Therefore, it is not necessary to separately prepare a bracket for attaching the vicinity of the connecting port to the side of the vehicle body before the attachment of the air bag to the vehicle, and the operation of attaching the air bag to the vehicle can be efficiently performed.

If the bracket has a configuration of being held with a holding mechanism such as a holding arm of an automatic assembly device for the inflator, the bracket can be used as a positioning mechanism of the connecting port (or the guide member) relative to the inflator and can be suitably utilized for automatic assembly of the inflator.

In such a case, if the bracket includes a holding portion that holds the inflator inserted into the connecting port, the inflator itself can also be attached to the side of the vehicle body by attaching the bracket to the side of the vehicle body in a state where the inflator is held by the holding portion, and attachment and fixation of the inflator to the vehicle can be easily performed.

Furthermore, in the air bag according to the invention, it is preferable that a clamp, which connects the connecting port to the inflator by fastening the connecting port to a side of an outer circumferential surface in a vicinity of the gas outlet port of the inflator that is inserted into the connecting port, is assembled with the outer circumferential side of the connecting port.

With such a configuration, the air bag includes, in advance, the clamp for fastening the inflator to the connecting port. Therefore, it is possible to connect the inflator to the connecting port of the air bag by inserting the inflator into the connecting port and then fastening the clamp, and it is not necessary to separately perform the operation of attaching the clamp to the connecting port before the insertion of the inflator into the connecting port. Therefore, it is possible to efficiently perform the operation of assembling the inflator with the connecting port.

Furthermore, in the air bag according to the invention, the guide member may include a cover portion that covers a circumference of the gas outlet port of the inflator, and a discharge hole that is disposed in the cover portion so as to be able to discharge the expansion gas while restricting a discharge direction toward a side of the air bag main body.

With such a configuration, the guide member can restrict the expansion gas to be discharged from the gas outlet port of the inflator inside the connecting port of the air bag main body so as to discharge the expansion gas in a predetermined discharge direction by using the discharge hole. That is, the guide member can prevent a situation in which the expansion gas from the inflator is directly sprayed to a portion that may affect the heat resistance inside the connecting port, and can enhance the heat resistance of the connecting port.

BRIEF DESCRIPTION OF THE DRAWINGS

FIG. 10 is an explanatory diagram of a process for assembling the guide member with the air bag main body according to the embodiment.

FIG. 11 is an explanatory diagram of a process for assembling the clamp and the bracket with the air bag main body according to the embodiment.

FIG. 12 is an explanatory diagram of a process for assembling the inflator with the air bag according to the embodiment.

FIG. 13 is an explanatory diagram of a process for assembling a clamp and a bracket according to another embodiment with the air bag main body.

FIG. 14 is an explanatory diagram of a process for assembling the inflator with the air bag illustrated in FIG. 13.

FIG. 16 is an explanatory diagram of a process for assembling a guide member with a connecting port of an air bag main body of an air bag according to another embodiment.

DETAILED DESCRIPTION OF THE INVENTION

Preferred embodiments of the present invention are described below with reference to the accompanying drawings. However, the invention is not limited to the embodiments disclosed herein. All modifications within the appended claims and equivalents thereto are intended to be encompassed in the scope of the claims.

Figure 1:
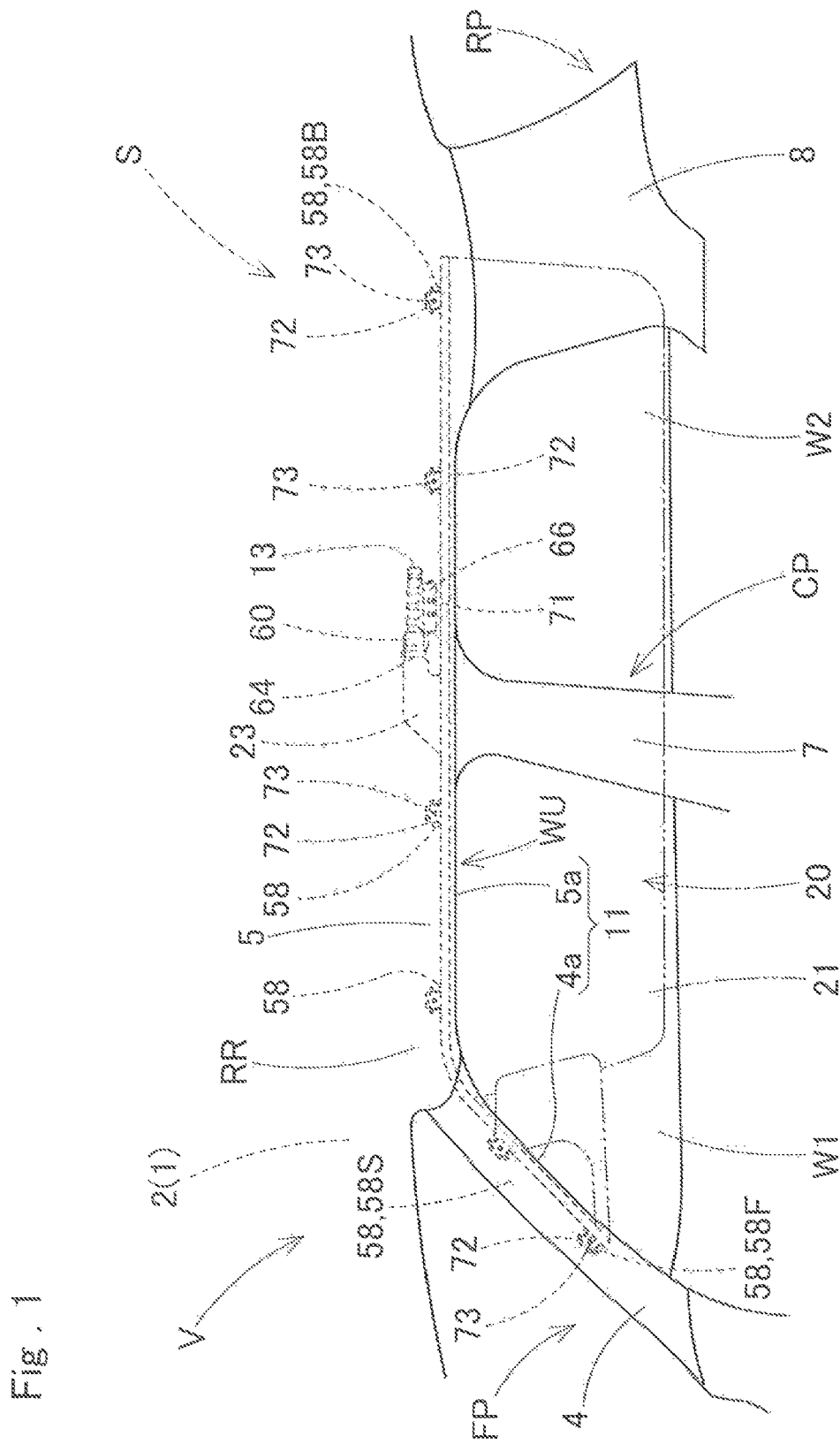
FIG. 1 is a front view of a state in which a head protecting air bag device using an air bag according to an embodiment of the invention is mounted on a vehicle when viewed from the inside of the vehicle.
Figure 2:
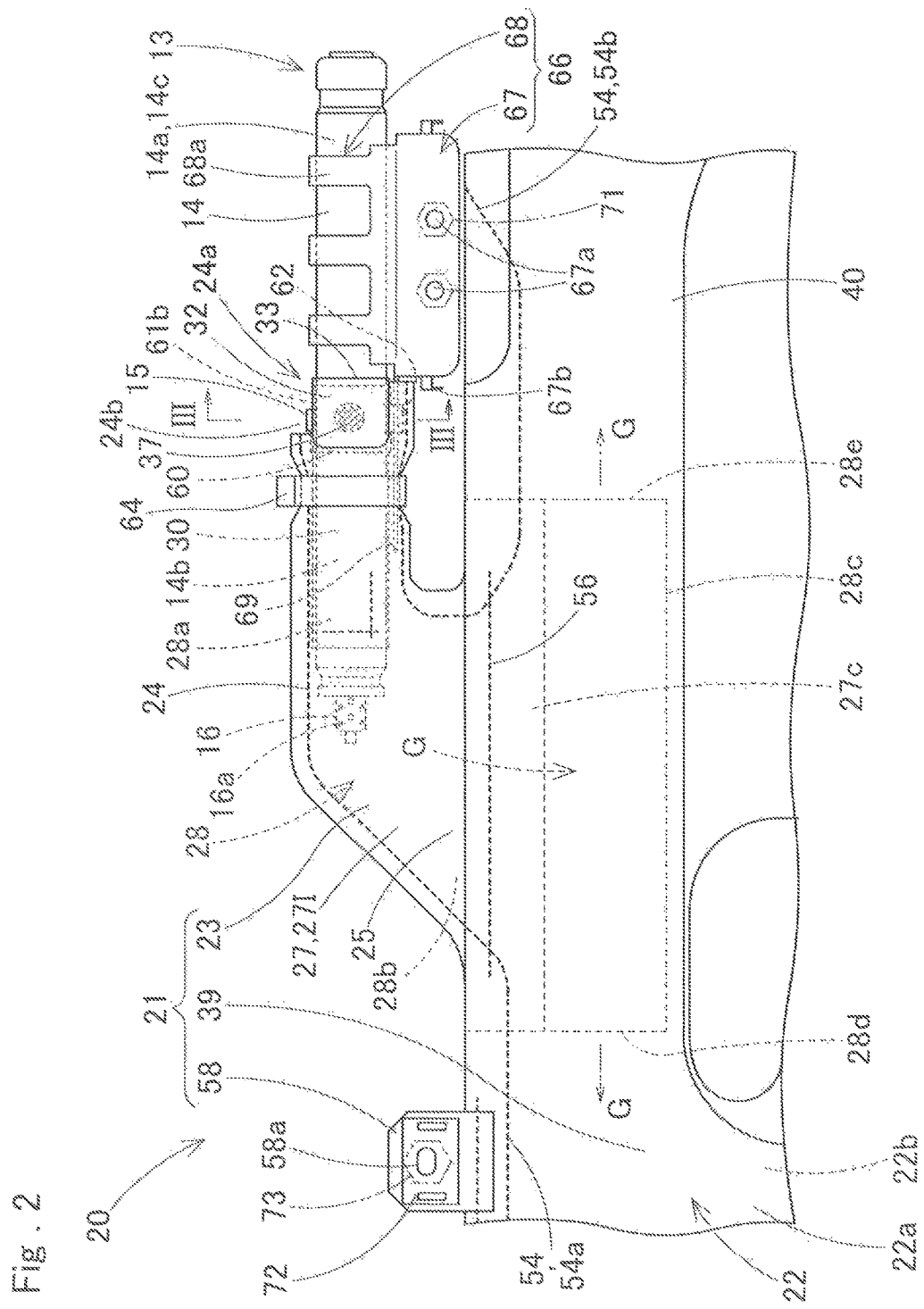
FIG. 2 is a partially enlarged front view schematically illustrating a vicinity of an inflator when the air bag device of FIG. 1 is operated.
Figure 3:
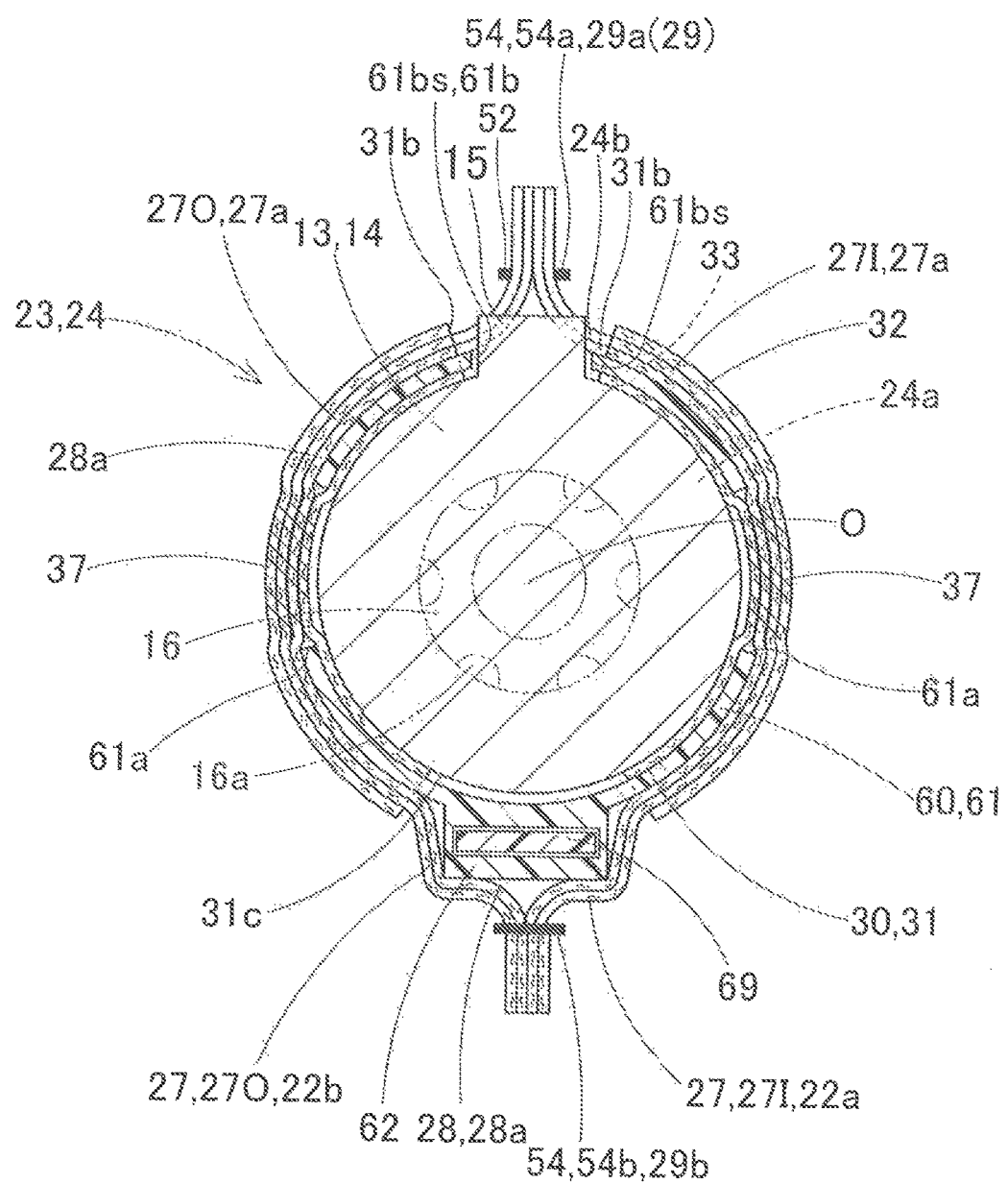
FIG. 3 is a schematic sectional view of the air bag device of FIG. 1 taken along line III-III in FIG. 2.
Figure 4:
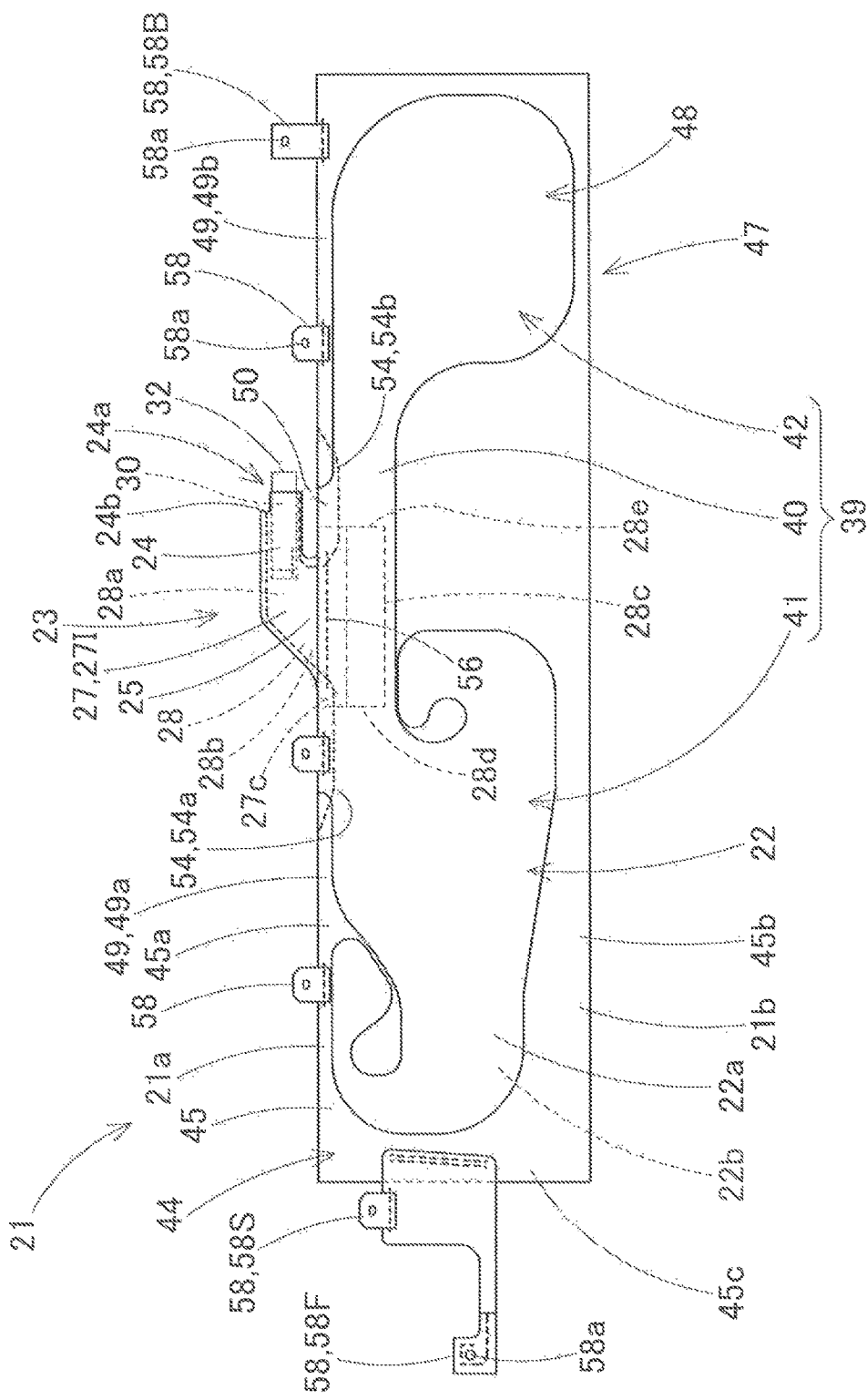
FIG. 4 is a front view of an air bag main body of the air bag according to the embodiment.

As illustrated in FIG. 1, an air bag device in which an air bag 20 according to an embodiment is used is a head protecting air bag device S, and the head protecting air bag device S includes the air bag 20, an inflator 13 that ejects expansion gas, and an air bag cover 11. The air bag 20 includes an air bag main body 21, a guide member 60, a clamp 64, a bracket 66, and an attachment bracket 72 as illustrated in FIGS. 2 to 4. The air bag main body 21 is folded and accommodated in a range from a lower edge side of a front pillar portion FP to an upper side of a rear pillar portion RP via an upper side of a central pillar portion CP on a side of upper edge WU of each of windows (side windows) W1 and W2 aligned at front and rear portions next to front sheets and back sheets inside a vehicle V as illustrated in FIG. 1.

Figure 6:
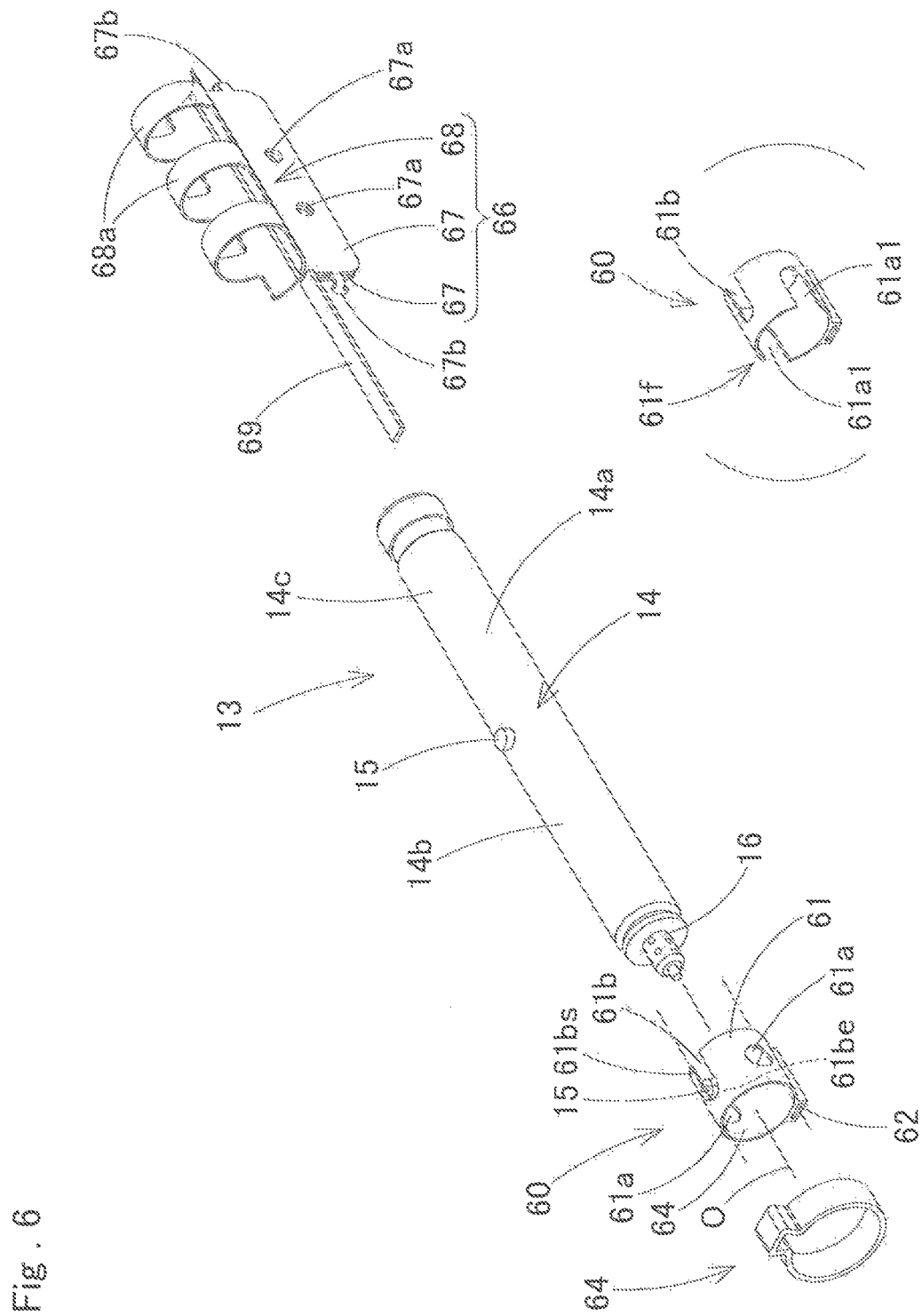
FIG. 6 is a perspective view schematically illustrating a guide member, a clamp, a bracket, and the inflator according to the embodiment.

The inflator 13 of a substantially columnar cylinder type is inserted into a connecting port 23 of the air bag 20, which will be described later, to cause expansion gas G to flow and is connected to the air bag 20 as illustrated in FIGS. 2, 3, and 6. The inflator 13 is configured as a hybrid type using mixture gas of combustion gas generated by burning a predetermined chemical agent by ignition using ignition equipment and sealed filling gas such as nitrogen, argon, or helium as the expansion gas G, and includes a columnar main body portion 14 and a gas ejecting portion 16 with a small-diameter columnar shape provided at the tip end of the main body portion 14. A plurality of gas outlet ports 16a are disposed in the gas ejecting portion 16, and the inflator 13 ejects the expansion gas G from these gas outlet ports 16a when operated.

The bracket 66 that pinches and holds the main body portion 14 is attached to the inflator 13 on a root side of an outer circumferential surface 14a of the main body portion 14, namely to a root-side outer circumferential surface 14c, and the bracket 66 is attached and fixed to an inner panel 2 of a roof side rail portion RR in the vicinity of the upper side of the central pillar portion CP so as to be covered with a lower edge 5a of a roof head lining 5 by being fastened with bolts 71 (see FIG. 1). The inflator 13 is inserted into an insertion tubular portion 24, which will be described later, of the connecting port 23 from the side of the gas ejecting portion 16 (the side of the gas outlet port 16a), and is connected to the insertion tubular portion 24 by being pressurized such that the insertion tubular portion 24 is pinched with the clamp 64 as a connecting mechanism on the side of the inflator 13.

The inflator 13 is designed to be operated by a predetermined control device that has detected a side surface collision or an oblique collision such as an offset collision of the vehicle V.

Furthermore, a columnar sealing pin 15 that functions as a positioning portion is provided in the inflator 13 so as to project from the outer circumferential surface 14a in the vicinity of the center of the main body portion 14 in a front-back direction to the upper side.

The air bag cover 11 includes a side of a lower edge 4a of a front pillar garnish 4 arranged at the front pillar portion FP and a side of a lower edge 5a of the roof head lining 5 arranged at the roof side rail portion RR as illustrated in FIG. 1.

The air bag 20 includes the air bag main body 21 that expands so as to cover the windows W1 and W2, the guide member 60, the clamp 64, the bracket 66, and the attachment bracket 72 as described above (see FIGS. 2 to 4).

Each attachment bracket 72 attaches and fixes an attachment portion 58, which will be described later, of the air bag 20 to the inner panel 2 on the side of the vehicle body (body) 1 with an attachment bolt 73 as illustrated in FIGS. 1 and 2. Each attachment bolt 73 is fastened to a screw hole provided with a nut in the inner panel 2.

The air bag main body 21 is developed from the folded state by the expansion gas G flowing from the inflator 13 and is developed and expands so as to cover the windows W1 and W2, the central pillar portion CP, and the rear pillar portion RP on the side of the inside of the vehicle. The air bag main body 21 includes a gas flowing portion 22 that expands so as to divide an inside-vehicle wall portion 22a as a front-side wall portion and an outside-vehicle wall portion 22b as a back-side surface portion by the expansion gas F flowing thereinto, and a gas non-flowing portion 44 into which the expansion gas G is not flowing in a state where the inside-vehicle wall portion 22a and the outside-vehicle wall portion 22b are coupled to each other as illustrated in FIGS. 2 to 5.

The gas flowing portion 22 includes an expansion portion 39 that covers the windows W1 and W2, the central pillar portion CP, and the rear pillar portion RP on the side of the inside of the vehicle, and a tubular connecting port 23 that is connected to the inflator 13 so as to cause the expansion gas G from the inflator 13 to flow into the expansion portion 39.

The connecting port 23 is disposed so as to project from the vicinity of the center of the expansion portion 39 in the front-back direction to the upper side. The connecting port 23 is formed into an L shape including a communicating tubular portion 25 connected to the expansion portion 39 so as to project from the side of the expansion portion 39 to the upper side in a substantially orthogonal direction and an insertion tubular portion 24 that projects from the communicating tubular portion 25 to the rear side in a substantially orthogonal direction at an upper end of the communicating tubular portion 25, and is mounted on the vehicle V in the bended state. The insertion tubular portion 24 is connected to the inflator 13 while the inflator 13 is inserted thereinto from an opening 24a at a rear end thereof.

The expansion portion 39 includes a front-side expansion portion 41 disposed so as to cover the window W1 on the side of the inside of the vehicle at the time of completion of the expansion, a rear-side expansion portion 42 disposed so as to cover the window W2 on the side of the inside of the vehicle, and a supply path portion 40 that is disposed in a tubular shape along the front-back direction on the side of an upper edge 21a of the air bag main body 21. The supply path portion 40 is a portion that is connected to the connecting port 23 at the center portion in the front-back direction and supplies the expansion gas G from the connecting port 23 to the front-side expansion portion 41 and the rear-side expansion portion 42.

In the embodiment, the air bag main body 21 includes, as components, an attachment portion 58 of the gas non-flowing portion 44, an outer cloth 27 that forms an outer circumferential side of the part corresponding to the connecting port 23, an inner cloth 28 that forms an inner circumferential side of the part corresponding to the connecting port 23, an attachment sheet portion 30, and a hollow-woven portion 47 that forms the part corresponding to the expansion portion 39 and is formed by hollow weaving. The hollow-woven portion 47 is formed by hollow weaving yarns made of polyamide, polyester, or the like, and includes a bag main body portion 48 that forms a gas flowing portion 22 that expands so as to divide the inside-vehicle wall portion 22a and the outside-vehicle wall portion 22b like sheet materials with expansion gas G flowing thereinto, and a closing portion 49 that is arranged in the circumference of the gas flowing portion 22 so as to couple the inside-vehicle wall portion 22a and the outside-vehicle wall portion 22b.

The outer cloth 27, the inner cloth 28, the attachment sheet portion 30, and the attachment portion 58 are formed of sheet materials with flexibility, such as cloth materials obtained by plain-weaving yarns made of polyamide, for example.

The gas non-flowing portion 44 is formed of a circumferential edge portion 45 and the attachment portion 58. The circumferential edge portion 45 is formed so as to surround the circumference of the gas flowing portion 22, and an upper edge 45a positioned on a side of the upper edge 21a of the air bag main body 21 is formed of a closing portion 49 of the hollow-woven portion 47 formed by hollow weaving and a bag forming sutured portion 54 that is integrally sutured with the outer cloth 27 or the like.

Figure 5:
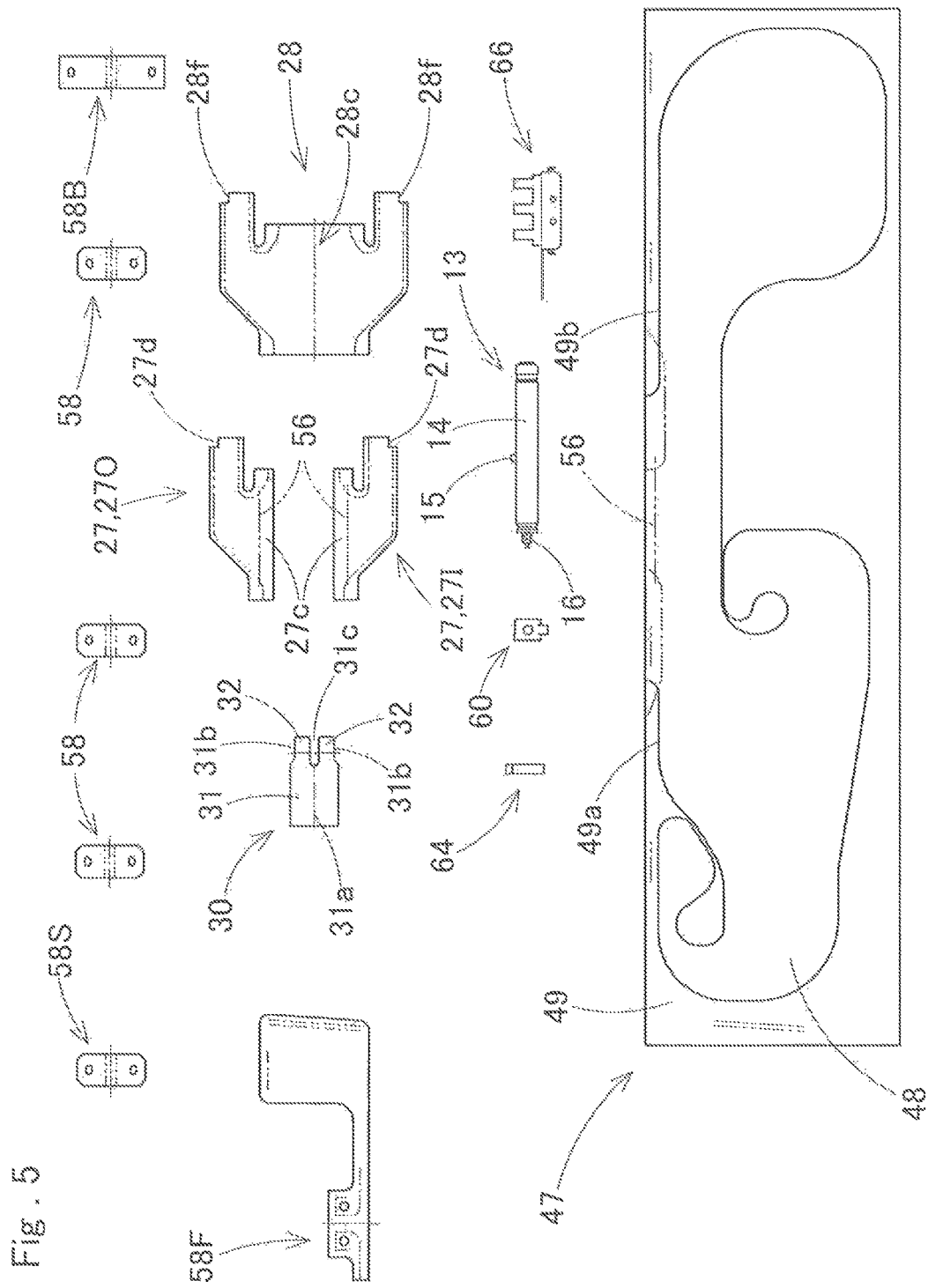
FIG. 5 is a front view schematically illustrating components of the air bag and the inflator according to the embodiment.

The closing portion 49 includes an upper front closing portion 49a and an upper rear closing portion 49b on the side of the upper edge 21a of the air bag main body 21, and a splitting part 50 as an opening portion is disposed therebetween. An extending part 27c of the outer cloth 27 (27I and 27O) on the side of the lower edge is sutured with each of the inside-vehicle wall portion 22a and the outside-vehicle wall portion 22b at the circumferential edge of the splitting part 50 by the coupling sutured portion 56 as illustrated in FIGS. 2, 4, and 5.

The outer cloths 27I and 27O form the inside-vehicle wall portion 22a and the outside-vehicle wall portion 22b of the connecting port 23 as illustrated in FIGS. 3, 5, 8A and 8B, and each of the outer cloths 27I and 27O includes an insertion-side portion 27a that forms the insertion tubular portion 24, a communicating-side portion 27b that forms the communicating tubular portion 25, and the extending part 27c that is sutured on the side of the expansion portion 39, in other words, on the side of the splitting part 50.

The inside-vehicle wall portion 22a and the outside-vehicle wall portion 22b of the splitting part 50 and the connecting port 23 are sutured with each other by a front edge-side sutured portion 54a and a rear edge-side sutured portion 54b of the bag forming sutured portion 54. The front edge-side sutured portion 54a extends from the upper front closing portion 49a toward the rear side and sutures the inside-vehicle wall portion 22a and the outside-vehicle wall portion 22b at the upper edge of the insertion tubular portion 24 from the upper edge of the communicating tubular portion 25 of the connecting port 23 via the splitting part 50 (see FIGS. 4, 9A, and 9B). The rear edge-side sutured portion 54b extends from the upper rear closing portion 49b toward the front side and sutures the inside-vehicle wall portion 22a and the outside-vehicle wall portion 22b at the lower edge of the insertion tubular portion 24 from the rear edge of the communicating tubular portion 25 of the connecting port 23 via the splitting part 50 (see FIGS. 4, 9A, and 9B).

In the embodiment, the front edge-side sutured portion 54a and the rear edge-side sutured portion 54b of the bag forming sutured portion 54 are configured so as to sew the inner cloth 28 together, specifically, the inner cloth 28 at a part corresponding to a sutured portion 29 which will be described later (see FIGS. 9A and 9B).

The plurality of (six in the embodiment) attachment portions 58 are formed so as to project from the upper edge 45a of the circumferential edge portion 45 on the side of the upper edge 21a of the air bag main body 21 toward the upper side as illustrated in FIG. 4. An attachment hole 58a into which an attachment bolt 73 is to be inserted is formed at each attachment portion 58. The attachment bracket 72 for attachment to the inner panel 2 on the side of the body 1 is fixedly attached to each attachment portion 58 as described above (see FIGS. 1 and 2), and each attachment portion 58 is fixed to the inner panel 2 by fastening an attachment bolt 73 inserted into each attachment hole 58a to each screw hole in the inner panel 2.

An attachment portion 58F at the front end is formed by suturing a separate cloth material, which is formed of a woven cloth made of polyamide or the like, with a front edge 45c of the circumferential edge portion 45 of the air bag main body 21 formed by the hollow weaving. The attachment portion 58F is fixed to the vicinity of the lower portion of the front pillar portion FP and is configured to exhibit strong tensile force on the side of the lower edge 21b of the air bag 20, specifically, on a line connecting the attachment portion 58F and the attachment portion 58 (58B; see FIG. 1) that is separate from the front pillar portion FP at the time of completion of the expansion of the air bag 20 and provide a satisfactory property of restricting a passenger toward an indoor side to the air bag 20.

The second attachment portion 58S from the front side is disposed by being sutured with the cloth material of the attachment portion 58F.

Figure 7:
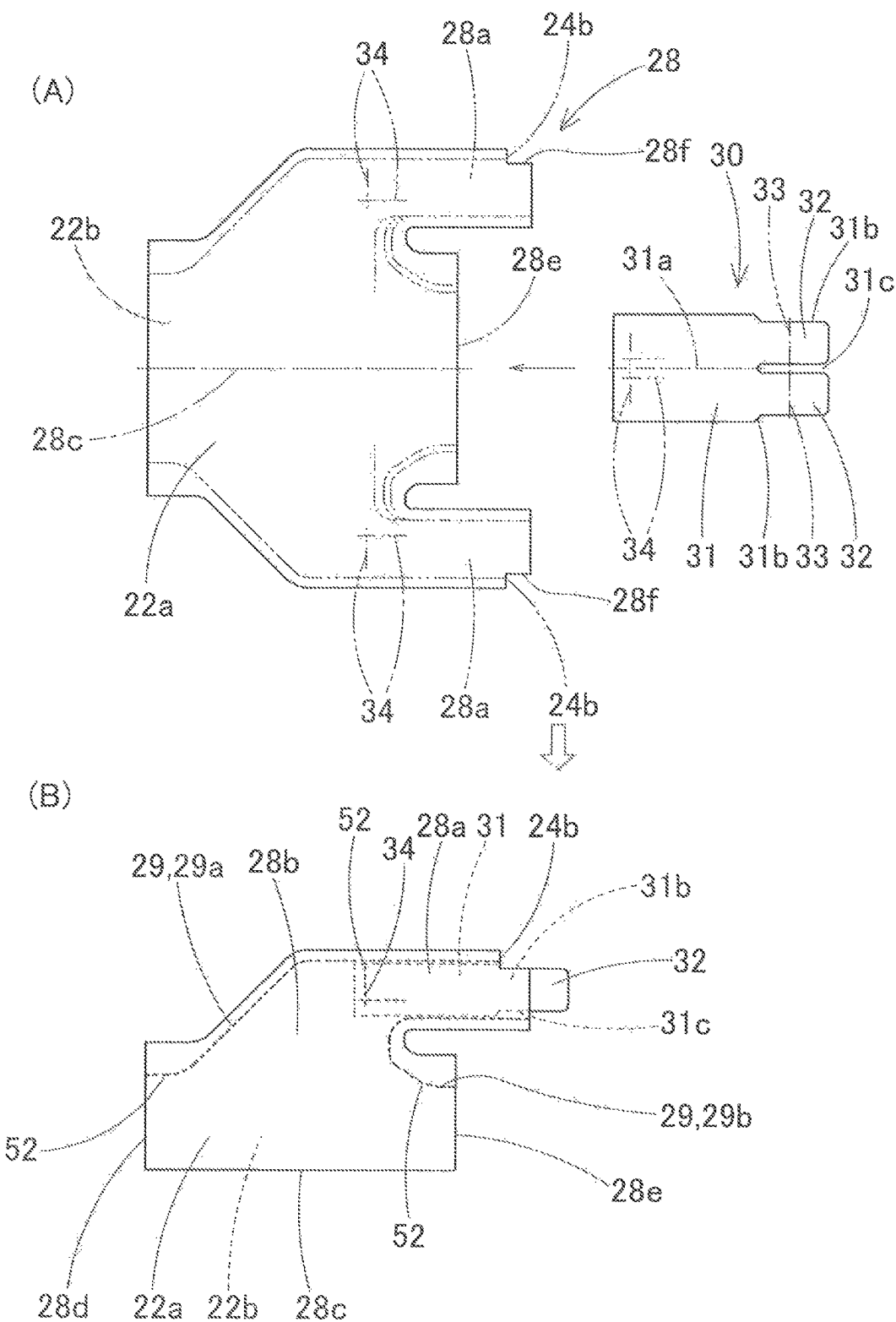
FIG. 7 is a diagram illustrating a process for forming the vicinity of the connecting port of the air bag main body according to the embodiment.
Figure 8:
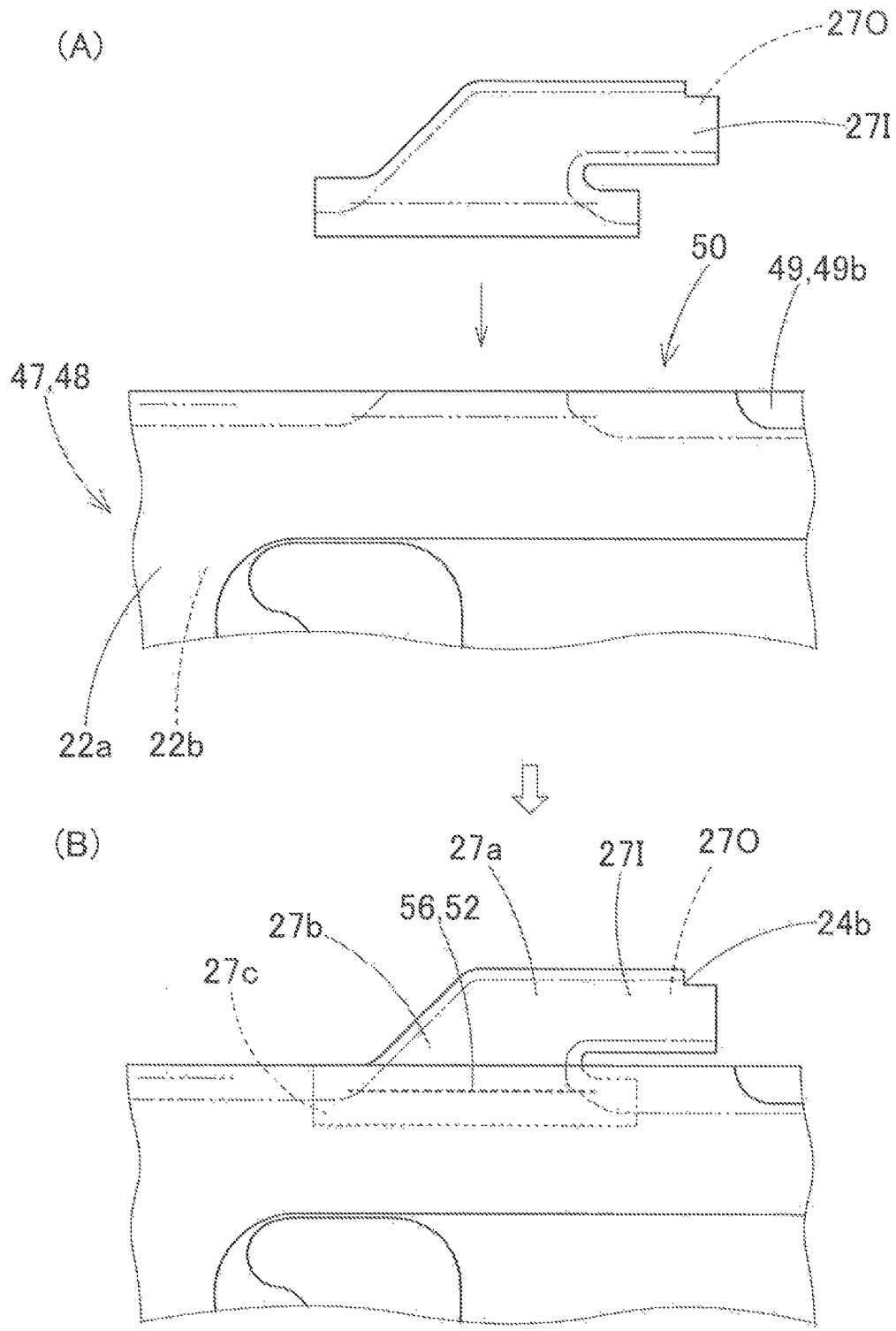
FIG. 8 is an explanatory diagram of a process for manufacturing the air bag main body according to the embodiment.

The inner cloth 28 is folded at a folding line 28c and is provided with the sutured portion 29 configured such that the overlapped predetermined circumferential edges are sutured with each other, and an insertion-side portion 28a that forms the insertion tubular portion 24 and a communicating-side portion 28b that forms the communicating tubular portion 25 are disposed on the side of the inner circumference of the outer cloth 27 as illustrated in FIGS. 5, 7A, and 7B. Both ends of the folding line 28c are opened without being sutured so as to form discharge ports 28d and 28e of the expansion gas G. The sutured portion 29 includes a sutured portion 29a at the upper front edge sutured from the side of the upper edge of the insertion-side portion 28a to the side of the front edge of the communicating-side portion 28b and a sutured portion 29b of the inner circumferential edge sutured from the side of the lower edge of the insertion-side portion 28a to the side of the rear edge of the communicating-side portion 28b.

The attachment sheet portion 30 includes a main body portion 31 that is sutured on the side of the inner circumferential surface of the insertion-side portion 28a of the inner cloth 28 in a state of being folded into two parts at a folding line 31a along the front-back direction and folded portions 32 and 32 folded from the rear end of the main body portion 31 toward the front side as illustrated in FIGS. 5, 7A and 7B. The main body portion 31 includes a recessed portion 31c formed on the side of the rear end of the folding line 31a so as to facilitate the folding at the folded portion 32, and recessed portions 31b are formed at both edges separate from the recessed portion 31c so as not to interface with the sealing pin 15 of the inflator 13. The folded portions 32 and 32 are welded at positions of attachment holes 61a, which will be described later, of the guide member 60 such that four portions including three portions, namely the main body portion 31, the insertion-side portion 27a of the outer cloth 27, and the insertion-side portion 28a of the inner cloth 28 are overlapped (see FIG. 3). The attachment sheet portion 30 is sutured with the side of the inner circumferential surface of the insertion-side portion 28a of the inner cloth 28 by a sutured portion 34 in the vicinity of the front end of the main body portion 31.

Recessed portions 27d and 28f are formed at the position of the recessed portions 31b of the attachment sheet portion 30 such that the outer cloth 27 and the inner cloth 28 do not interfere with the sealing pin 15, and the recessed portions 27d and 28f form a recessed portion 24b at an upper portion on the side of a rear edge of an opening 24a in the connecting port 23 (see FIGS. 2, 3, and 5).

The guide member 60 is formed of a synthesized resin material with a shape holding property, such as polyolefin (TPO), and includes a cylindrical tubular portion 61 into which the main body portion 14 of the inflator 13 can be inserted with the main body portion 31 of the attachment sheet portion 30 interposed therebetween as illustrated in FIGS. 3 and 6. The tubular portion 61 is disposed such that an axial direction O extends along the front-back direction. An assembled recessed portion (assembled portion) 62 with which the bracket 66 is assembled is formed on the side of the lower end of the tubular portion 61 such that an assembled piece (assembled portion) 69 with a band plate shape, which will be described later, of the bracket 66 penetrates therethrough.

Attachment holes 61a and 61a that open in circular shapes are formed in the tubular portion 61 on the side of the inside-vehicle wall portion 22a and the side of the outside-vehicle wall portion 22b, and a position restricting portion 61b formed of a recessed groove to which the sealing pin 15 as a part positioning the inflator 13 is fitted is formed on the side of the upper end. The recessed groove of the position restricting portion 61b is an opening with a long circular shape from the rear end of the tubular portion 61 to the front side, an end surface 61be of the recessed groove on the side of the bottom surface abuts on the sealing pin 15 at the time of the insertion of the inflator 13 into the connecting port 23 and restricts movement of the inflator 13 toward the front side, and both surfaces 61bs extending from the end surface 61be toward the rear side abut on the sealing pin 15 and restrict rotation of the inflator 13 about the axis. The width of the opening of the recessed groove of the position restricting portion 61b is set to be slightly larger than the diameter of the sealing pin 15 (see FIG. 3).

The guide member 60 is attached and fixed to the connecting port 23 without deviation and separation by arranging the guide member 60 between the main body portion 31 of the attachment sheet portion 30 and the insertion-side portion 28a of the inner cloth, folding the folded portion 32 of the attachment sheet portion 30 on the side of the outer surface of the outer cloth 27, and welding overlapped four portions, namely the main body portion 31 of the attachment sheet portion 30, the folded portion 32, the insertion-side portion 27a of the outer cloth 27, and the insertion-side portion 28a of the inner cloth 28 at the positions of the attachment holes 61a and 61a to form the welded portions 37.

The clamp 64 is arranged as a substantially cylindrical member made of a metal plate in the circumference of the insertion tubular portion 24 that is separate on the front side from the opening 24a of the connecting port 23 as illustrated in FIGS. 2, 6, 11A and 11B. The clamp 64 is swaged and plastically deformed to reduce the diameter thereof so as to be able to secure the sealing property of the connecting port 23 and connect the inflator 13 thereto when the inflator 13 is inserted into the connecting port 23 (see FIGS. 12A and 12B), and the clamp 64 is used to press-fit and fasten the insertion tubular portion 24 of the connecting port 23 to an outer circumferential surface 14b on the side of the tip end of the main body portion 14 of the inflator 13.

The bracket 66 includes two attachment plate portions 67 provided with attachment holes 67a and 67a into which the bolts 71 fastened to the predetermined screw holes in the body 1 are inserted and a clamp portion 68 as a holding unit that has a ring shape coupling the two attachment plate portions 67 and can hold the inflator 13 as illustrated in FIGS. 2, 6, 11A, 11B, 12A, and 12B. The clamp portion 68 includes three ring portions 68a. The clamp portion 68 holds the inflator 13 by inserting the inflator 13 to the ring portions 68a, fastening the clamp 64, plastically deforming the respective ring portions 68a to reduce diameters thereof, and press-fitting the ring portions 68a to the root-side outer circumferential surface 14c of the main body portion 14 of the inflator 13 when the inflator 13 is inserted into the connecting port 23.

The assembled piece 69 as an assembled portion for assembling the bracket 66 with the guide member 60 is disposed at the attachment plate portion 67 of the bracket 66 so as to be inserted into an assembled recessed portion 62 of the guide member 60. In the embodiment, the assembled piece 69 extends up to the inner circumferential surface side on the lower end side of the clamp 64 to which the connecting port 23 is attached. That is, in the embodiment, the assembled piece 69 is also press-fitted to the outer circumferential surface 14a of the main body portion 14 of the inflator when the clamp 64 is swaged to reduce the diameter thereof.

Latch claws 67b and 67b for latching the bracket 66 at the body 1 until the bolt 71 is fastened to the body 1 are formed in the attachment plate portion 67.

Description will be given of fabrication of the air bag 20 according to the embodiment. First, the inner cloth 28 developed into a flat state is folded at the position of the folding line 28c to cause the insertion-side portions 28a and 28a to approach each other, providing the sutured portion 34, and attaching the vicinity of the front ends extending on both sides from the folding line 31a of the main body portion 31 of the attachment sheet portion 30, which is folded at the folding line 31a, to the inner circumferential surface side of the inner cloth 28 as illustrated in FIG. 7A. The sutured portion 34 is formed of sutured lines of sutured yarns 52 extending in a linear shape in the front-back direction and the upper-lower direction. Then, the state where the main body portion 31 of the attachment sheet portion 30 is folded at the folding line 31a is maintained, sutured portions 29 (29a and 29b) are provided to suture the overlapped outer circumferential edges of the inner cloth 28, which is folded at the folding line 28c, and the insertion-side portion 28a and the communicating-side portion 28b formed of the inner cloth 28 provided with the discharge ports 28d and 28e are formed as illustrated in FIG. 7B.

As illustrated in FIGS. 8A and 8B, a coupling sutured portion 56 using the sutured yarns 52 is provided in advance to suture the outer cloths 27I and 27O with the inside-vehicle wall portion 22a and the outside-vehicle wall portion 22b at the splitting part 50 of the hollow-woven portion 47.

Figure 9:
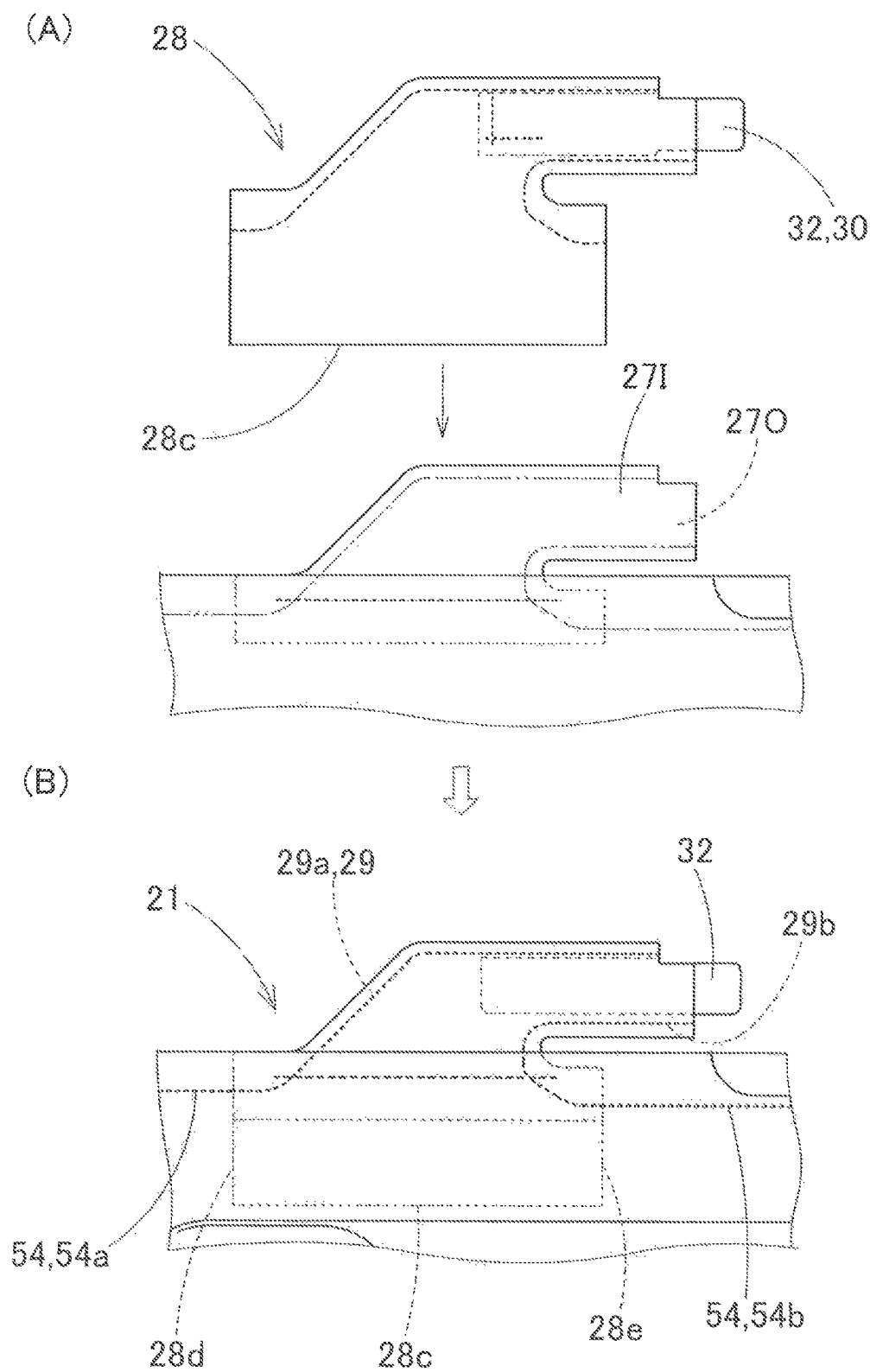
FIG. 9 is an explanatory diagram of the process for manufacturing the air bag main body according to the embodiment, and illustrates a process to be performed after the process in FIG. 8.
Figure 15:
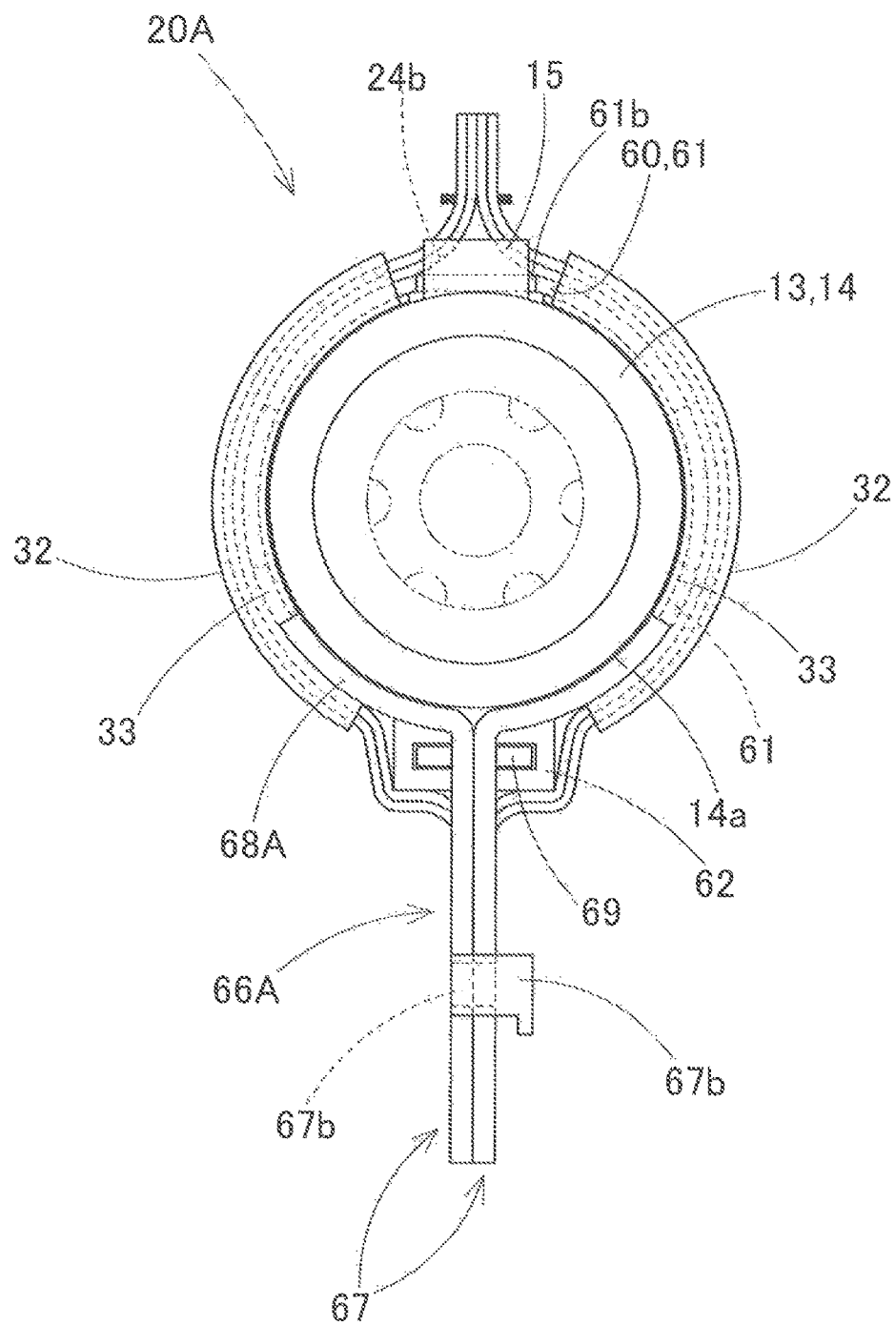
FIG. 15 is a diagram illustrating a state in which the inflator is assembled with the air bag illustrated in FIG. 13 when viewed from a rear side of the inflator.

Then, the inner cloth 28 with which the attachment sheet portion 30 is sutured is arranged between the opening outer cloths 27I and 27O as illustrated in FIG. 9A. Then, the connecting port 23 with the attachment sheet portion 30 disposed therein can be formed by providing the front edge-side sutured portion 54a and the rear edge-side sutured portion 54b of the bag forming sutured portion 54 using the sutured yarns 52 and sewing the outer cloths 27I and 27O and the inner cloth 28 together as illustrated in FIG. 9B. The part of the inner cloth 28 that is sewn with the outer cloths 27I and 27O by the front edge-side sutured portion 54a corresponds to the sutured portion 29a. The part of the inner cloth 28 that is sewn with the outer cloths 27I and 27O by the rear edge-side sutured portion 54b corresponds to the sutured portion 29b.

Then, the air bag main body 21 can be formed by suturing the attachment portion 58 at a predetermined part.

Thereafter, the air bag main body 21 is folded so as to cause the side of the lower edge 21b to approach the side of the upper edge 21a, a tape that is for preventing the folded shape from being lost and can be cut, which is not shown in the drawing, is wound, and the attachment bracket 72 is attached to each attachment portion 58.

At the same time, the position restricting portion 61b is positioned relative to the recessed portion 24b (27d, 28f, and 31b) (see FIGS. 5 to 8B), the guide member 60 is arranged between the side of the outer circumference of the main body portion 31 of the attachment sheet portion 30 and the side of the inner circumference of the inner cloth 28 as illustrated in FIGS. 10A and 10B, the folded portion 32 of the attachment sheet portion 30 is then folded on the side of the outer surfaces of the outer cloths 27I and 27O, the welded portions 37 are formed by welting the four overlapped portions, namely the main body portion 31 of the attachment sheet portion 30, the folded portion 32, the insertion-side portion 27a of the outer cloth 27, and the insertion-side portion 28a of the inner cloth 28 at the parts corresponding to the attachment holes 61a and 61a of the guide member 60, and the guide member 60 is attached to the connecting port 23 (see FIG. 3).

Thereafter, the air bag 20 can be manufactured by fitting the clamp 64 to the side of the outer circumferential surface that is separate on the front side from the opening 24a of the connecting port 23, then inserting the assembled piece 69 of the bracket 66 into the connecting port 23 up to the position of the clamp 64 while fitting the assembled piece 69 to the assembled recessed portion 62 of the guide member 60, and assembling the assembled piece 69 to the guide member 60 as illustrated in FIGS. 11A and 11B.

Then, the manufactured air bag 20 is appropriately folded at predetermined locations and is then packed. Thereafter, the inflator 13 may be assembled with a predetermined location, namely the air bag 20 to manufacture the air bag device S, and further, the air bag device S may be transported to a location where the air bag device S is mounted on the vehicle V.

In a case of assembling the inflator 13 with the air bag 20 thereafter, the package of the air bag 20 is opened, the inflator 13 is inserted into the clamp portion 68 of the bracket 66, and the inflator is inserted into the connecting port 23 provided with the guide member 60 until the sealing pin 15 thereof is fitted to the position restricting portion 61b of the guide member 60 and the position thereof is restricted by the end surface 61be thereof as illustrated in FIGS. 12A and 12B. If the position of the inflator 13 is restricted, then the part corresponding to the outer circumferential surface 14b on the side of the tip end of the main body portion 14 of the inflator 13 is arranged at the arrangement position at the clamp 64. If the clamp 64 and the clamp portion 68 of the bracket 66 are swaged so as to reduce the diameters thereof, then the inflator 13 can be connected to the connecting port 23, the inflator 13 can be held by the bracket 66, and the head protecting air bag device S can be thus assembled.

According to the head protecting air bag device S assembled as described above, each attachment portion 58 assembled with the attachment bracket 72 is arranged at a corresponding attachment part in the inner panel 2 on the side of the body 1, the attachment bolt 73 is fastened to the screw hole by inserting the attachment bolt 73 into each attachment hole 58a, for example, the attachment plate portion 67 of the bracket 66 is further fastened with the bolt 71 to fix the inflator 13 to the inner panel 2, and the air bag device S is thus attached to the body 1. Then, the head protecting air bag device S can be mounted on the vehicle V by connecting lead lines extending from a predetermined control device for operating the inflator to the inflator 13, which is not illustrated in the drawing, attaching the front pillar garnish 4 and the roof head lining 5 to the body 1, and further, attaching the central pillar garnish 7 and the rear pillar garnish 8 to the body 1 (see FIG. 1).

If the inflator 13 is operated after the head protecting air bag device S is mounted on the vehicle V, the expansion gas G is ejected from the gas outlet port 16a of the gas ejecting portion 16 of the inflator 13, and flows from the connecting port 23 of the air bag 20 toward the side of the expansion portion 39. Specifically, the expansion gas G flows from the gas outlet port 16a of the gas ejecting portion 16 to the communicating tubular portion 25 through the insertion tubular portion 24 of the connecting port 23, and then flows from the discharge ports 28d and 28e before and after the inner cloth 28 to the front-side expansion portion 41 and the rear-side expansion portion 42 of the expansion portion 39 through the supply path portion 40 in the expansion portion 39 of the air bag main body 21 as illustrated in FIG. 2. Therefore, the air bag main body 21 of the air bag 20 pushes and opens the air bag cover 11, and is then developed and expands so as to cover the windows W1 and W2, the central pillar portion CP, and the rear pillar portion PP on the side of the inside of the vehicle as represented by the two-dotted chain line in FIG. 1.

In the embodiment, the guide member 60 that has a shape holding property of maintaining the opened state of the connecting port 23 so as to be able to guide the insertion of the outer circumferential surface 14b on the side of the tip end of the main body portion 14, which corresponds to the side of the gas outlet port 16a of the inflator 13, into the part corresponding to the connecting port 23 of the air bag main body 21 when the inflator 13 is inserted into the connecting port 23 of the air bag 20 is provided. Therefore, it is possible to insert the inflator 13 into the connecting port 23 without being trapped by merely moving the inflator 13 from the side of the gas outlet port 16a along the orthogonal direction of the opening 24a, namely the axial direction O of the guide member 60 in the embodiment relative to the opening 24a of the connecting port 23 in a state where the vicinity of the guide member 60 is held.

Therefore, the air bag 20 according to the embodiment facilitates the insertion of the inflator 13 into the connecting port 23 and also facilitates the automatic assembly of the inflator 13.

Since the guide member 60 has a tubular shape (a cylindrical shape in the embodiment) in the embodiment, it is possible to stabilize the direction of the insertion of the inflator 13 into the connecting port 23 along the axial direction O of the tubular shape of the guide member 60 and to quickly insert the inflator 13 into the connecting port 23.

The guide member may also have an O-ring shape or a C-ring shape without considering the aforementioned configuration as long as the opening shape (the circular shape in the embodiment) in the state where the opening 24a of the connecting port 23 is opened can be maintained. In the case of forming the guide member into the tubular shape, the tubular shape of the guide member is not limited to the cylindrical shape and may also be a substantially quadrangular prism shape, a substantially triangular prism shape, or a combination of the cylindrical shape and the prism shape, for example, as long as the inflator 13 can be guided along the axial direction O thereof.

In the air bag 20 according to the embodiment, the guide member 60 includes the attachment holes 61a with inner and outer circumferences through which the guide member 60 penetrates. The connecting port 23 of the air bag main body 21 includes the attachment sheet portion 30 that covers the attachment holes 61a and the circumference edge of the attachment holes 61a on the side of the inner circumference of the guide member 60. Furthermore, the attachment sheet portion 30 includes the welded portions 37 that face the attachment sheet portion 30 with the attachment holes 61a interposed therebetween and are welded to the sheet materials (the outer cloth 27 and the inner cloth 28) forming the connecting port 23 through the attachment holes 61a. The guide member 60 is attached to the connecting port 23 with the welded portions 37.

Therefore, it is possible to attach the guide member 60 to the connecting port 23 by merely welding the attachment sheet portion 30 and the sheet material (the outer cloth 27 and the inner cloth 28) forming the connecting port 23 to each other through the attachment holes 61a of the guide member 60 and to thereby easily attach the guide member 60 in the embodiment.

In particular, if the plurality of (two in the embodiment) attachment holes 61a are formed in the guide member 60 such that the plurality of (two in the embodiment) welded portions 37 are disposed so as to be separate from each other about the axial center of the guide member 60 in the embodiment, it is possible to more stably attach the guide member 60 to the connecting port 23 and to more stably and quickly insert the inflator 13 by suppressing deviation of the sheet part (the main body portion 31 of the attachment sheet portion 30 in the embodiment) that is brought into contact with the inflator 13 when the inflator 13 is inserted.

The attachment holes 61a may not have the opening shapes with the entire circumferential edges surrounded by the inside of the tubular portion 61 and may be attachment holes 61a1 opened so as to be recessed from the side of the front edge 61f that is separate from the side of the opening 24a into which the inflator 13 is inserted (see the drawing in the bracket in FIG. 6). Even with such a configuration, the rotation about the axial direction O of the guide member 60 itself as a central axis is restricted, and the position restricting portion 61b of the guide member 60 can be arranged at the predetermined position as long as the welded portions 37 are formed in the same manner as the attachment holes 61a.

The welded portion 37 may be formed by extending the folded portions 32 and 32 on the front side that is separate from the front edge 61f of the guide member 60, and welding the four portions, namely the folded portions 32 and 32, the outer cloth 27, the inner cloth 28, and the main body portion 31 at the vicinity position thereof that is separate from the front edge 61f without providing the attachment holes in the guide member 60 though it is not possible to restrict such rotation about the axial direction O of the guide member 60 as a central axis. Even in such a case, the guide member 60 is attached to the connecting port 23 while the movement thereof along the axial direction O is restricted.

Furthermore, the attachment sheet portion 30 includes the folded portions 32 and 32 disposed on the side of the opening 24a of the connecting port 23 so as to cover the side of the inner circumference and the side of the outer circumference of the guide member 60 in the air bag 20 according to the embodiment. In addition, the welded portion 37 is formed over the main body portion 31 on the side of the inner circumference and the folded portion 32 on the side of the outer circumference of the guide member 60 at the attachment sheet portion 30.

Therefore, since the folded portions 32 and 32 of the attachment sheet portion 30, more specifically, the cover portion 33 bent from the main body portion 31 of the folded portion 32 covers the circumferential edge of the opening 24a of the connecting port 23, the cover portion 33 of the folded portion 32 of the attachment sheet portion 30 can prevent the inflator 13 from entering between the guide member 60 on the side of the inner circumference of the guide member 60 and the part corresponding to the sheet materials (the outer cloth 27 and the inner cloth 28) of the connecting port 23 or the attachment sheet portion 30, and the insertion of the inflator 13 into the connecting port 23 can be further smoothly and quickly performed according to the embodiment.

In addition, if the gas electing portion 16 of the inflator 13 enters between the guide member 60 on the side of the inner circumference of the guide member 60 and the part corresponding to the sheet materials (the outer cloth 27 and the inner cloth 28) of the connecting port 23 or the attachment sheet portion 30, in the embodiment, between the guide member 60 on the side of the inner circumference of the tubular portion 61 and the main body portion 31 of the attachment sheet portion 30 in a state where the cover portion 33 is not provided, then the main body portion 31 of the attachment sheet portion 30 is turned up on the side of the inner circumference of the tubular portion 61 of the guide member 60, for example, due to the entrance of the inflator 13 at the inappropriate position, the side of the inner circumference of the guide member 60 is blocked, and the entrance of the inflator 13 is stopped. Eventually, it is necessary to pull out the inflator 13 and perform the operation of connecting the inflator 13 to the connecting port 23 again.

Furthermore, the guide member 60 includes the position restricting portion 61b that restricts the position of the sealing pin 15 as a port of positioning the inflator 13 and defines the insertion position of the inflator 13 when the inflator 13 is inserted into the connecting port 23 in the air bag 20 according to the embodiment.

Therefore, since the inflator 13 is inserted into an appropriate position relative to the connecting port 23 by the position restricting portion 61b of the guide member 60 restricting the position of the sealing pin 15 at the part of positioning the inflator 13 when the inflator 13 is inserted into the connecting port 23, it is possible to quickly and smoothly perform the operation of inserting the inflator 13 into the connecting port 23 according to the embodiment.

In the air bag 20 according to the embodiment, the bracket 66 to be attached to the side of the body 1 is assembled with the guide member 60 while the assembled piece 69 is inserted into the assembly recessed portion 62 of the guide member 60.

Therefore, since the connecting port 23 of the air bag 20 provided with the guide member 60 includes, in advance, the bracket 66 that is assembled with the guide member 60 and can be attached to the side of the body 1, it is not necessary to separately prepare the bracket for attaching the vicinity of the connecting port 23 to the side of the body 1 before the attachment of the air bag 20 to the vehicle V, and it is possible to efficiently perform the operation of attaching the air bag 20 to the vehicle V according to the embodiment.

If the bracket 66 is configured to be held by a holding mechanism such as a holding arm A2 of an automatic assembly device for holding the inflator 13 as illustrated in FIGS. 12A and 12B, the bracket 66 can be used as the mechanism of positioning the connecting port 23 (guide member 60) relative to the inflator 13 held by a holding arm A1 and can be suitably utilized for the automatic assembly of the inflator 13. In addition, the holding mechanism such as the holding arm A2 may hold the part corresponding to the guide member 60 of the connecting port 23 in addition to the bracket 66, or alternatively, hold only the part corresponding to the guide member 60 of the connecting port 23 instead of the bracket 66.

Furthermore, the bracket 66 includes the clamp portion 68 as a holding portion that holds the inflator 13 inserted into the connecting port 23 according to the embodiment.

Therefore, it is possible to attach the inflator 13 itself to the side of the body 1 by attaching the bracket 66 to the side of the body 1 even in the state where the inflator 13 is held by the clamp portion 68 as the holding portion, and to easily attach and fix the inflator 13 to the vehicle V according to the embodiment.

Furthermore, the clamp 64 that fastens the connecting port 23 to the side of the outer circumferential surface 14b in the vicinity of the gas outlet port 16a of the inflator 13 inserted into the connecting port 23 and connects the connecting port 23 to the inflator 13 is assembled on the side of the outer circumference of the connecting port 23 in the air bag 20 according to the embodiment.

Therefore, since the air bag 20 includes, in advance, the clamp 64 for fastening the inflator 13 to the connecting port 23, it is possible to connect the inflator 13 to the connecting port 23 of the air bag 20 by inserting the inflator 13 into the connecting port 23 and then fastening the clamp 64, and it is not necessary to separately perform the operation of attaching the clamp 64 to the connecting port 23 before the insertion of the inflator 13 into the connecting port 23 according to the embodiment. Therefore, it is possible to efficiently perform the operation of assembling the inflator 13 with the connecting port 23.

Although the embodiment was described as the case where the bracket 66 included the clamp portion 68 as the holding portion for holding the inflator 13, a bracket 66A without the holding portion that directly holds the inflator 13 may be used as illustrated in FIGS. 13A to 15.

The air bag 20A includes the air bag main body 21, the guide member 60, the clamp 64A, and the bracket 66A. The air bag main body 21 and the guide member 60 are the same as those used in the air bag 20. The clamp 64A is formed by elongating a length dimension of the clamp 64 in the axial direction.

The bracket 66A does not include the clamp portion 68 as the holding portion and includes a support surface portion 68A that supports the lower side of the outer circumferential surface 14a of the main body portion 14 of the inflator 13.

The bracket 66A includes the attachment plate portion 67 including the same attachment holes 67a as those of the bracket 66 and the assembled piece 69 that is assembled with the assembly recessed portion 62 of the guide member 60.

According to the air bag 20A, the guide member 60 is disposed at the connecting port 23 of the air bag main body 21 in the same manner as the air bag 20, the clamp 64A is disposed on the side of the outer circumference of the connecting port 23, the bracket 66A causes the assembled piece 69 to be inserted into the assembly recessed portion 62 of the guide member 60, and furthermore, the assembled piece 69 is assembled with the guide member 60 in a state of being inserted up to the side of the inner circumference of the clamp 64A (see FIGS. 13A and 13B).

The inflator 13 is inserted into the connecting port 23 provided with the guide member 60 until the sealing pin 15 of the inflator 13 is fitted to the position restricting portion 61b of the guide member 60 and the position of the sealing pin 15 is restricted as illustrated in FIGS. 14A and 14B when the inflator 13 is connected to the connecting port 23 of the air bag 20A. If the position of the inflator 13 is restricted, the part corresponding to the outer circumferential surface 14b on the side of the tip end of the main body portion 14 of the inflator 13 is arranged at the arrangement position at the clamp 64A. If the clamp 64A is then swaged so as to reduce the diameter thereof, it is possible to connect the inflator 13 to the connecting port 23, to support the inflator 13 on the support surface portion 68A of the bracket 66A, and to thereby assemble a head protecting air bag device SA.

Since the cylindrical guide member 60 with the shape holding property of maintaining the opening state of the connecting port 23 is disposed in the same manner as in the air bag 20, it is possible to insert the inflator 13 into the connecting port 23 without being trapped by merely moving the inflator 13 along the axial direction of the guide member 60 of the connecting port 23 from the side of the gas outlet port 16a when the inflator 13 is inserted into the connecting port 23 of the air bag 20A, and to thereby achieve the same effects and advantages as those of the air bag 20.

It is a matter of course that the bracket 66A can also be used as the mechanism of positioning the connecting port 23 (guide member 60) relative to the inflator 13 held by the holding arm A1 if the bracket 66A is configured to be held by the holding mechanism such as the holding arm A2 of the automatic assembly device for holding the inflator 13 as illustrated in FIGS. 14A and 14B, and can be suitably utilized for the automatic assembly of the inflator 13. It is a matter of course that the holding mechanism such as the holding arm A2 may hold the part corresponding to the guide member 60 of the connecting port 23 even in this case.

Furthermore, according to the head protecting air bag device SA assembled as described above, each attachment portion 58 with which the attachment bracket 72 has been assembled is arranged at the corresponding attachment part in the inner panel 2 on the side of the body 1, the attachment bolt 73 is fastened to the screw hole by inserting the attachment bolt 73 into each attachment hole 58a, for example, and the attachment plate portion 67 of the bracket 66A is further fastened with the bolt 71. Since the bracket 66A is assembled with the guide member 60 with the assembled piece 69 inserted into the assembly recessed portion 62, and the guide member 60 is attached to the connecting port 23 by using the welded portion 37 at this time, it is possible to attach the connecting port 23 itself to the side of the body 1.

Furthermore, since the assembled piece 69 of the bracket 66A is integrally assembled with the inflator 13 by swaging the clamp 64A and the outer circumferential surface 14a of the inflator 13 can be supported by using the support surface portion 68A of the bracket 66A in the case illustrated in the drawings, it is possible to attach and fix the inflator 13 to the side of the body 1 by using the clamp 64A and the bracket 66A.

In this case, the inflator 13 connected to the connecting port 23 may be separately attached and fixed to the side of the body 1 by using a predetermined attachment bracket, and the bracket 66A may be configured to attach the connecting port 23 itself to the side of the body 1 without being provided with the support surface portion 68A.

Figure 17:
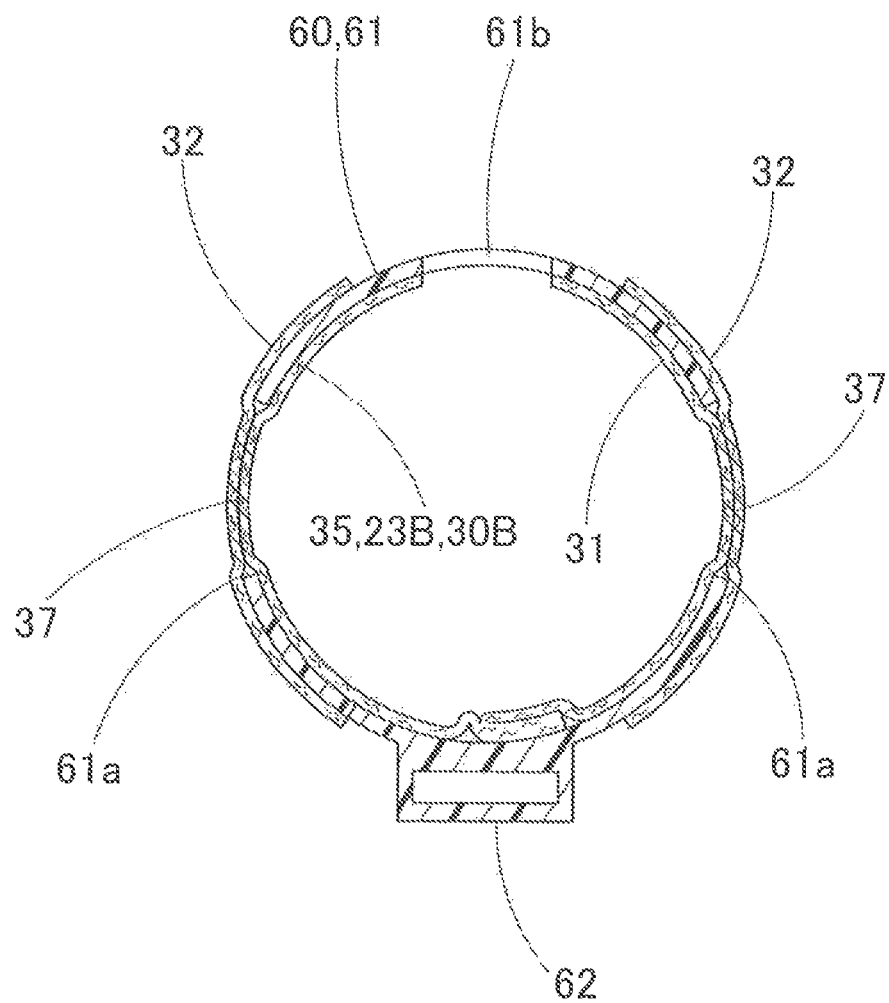
FIG. 17 is a schematic sectional view taken along line XVII-XVII of (C) of FIG. 16.

Although the embodiment was described as the case where the guide member 60 was disposed on the side of the inner surface of the connecting port 23 of the air bag 20, another configuration may also be employed in which the guide member 60 is arranged on the side of an outer circumferential surface of a connecting port 23B of an air bag main body 21B, the connecting port 23B itself is shared with the main body portion 31 of an attachment sheet portion 30B, the folded portion 32 is arranged on the side of the outer circumferential surface of the guide member 60, and the welded portion 37 is formed by mutually welding the connecting port 23B and the folded portion 32, which face each other, at the attachment holes 61a as in an air bag 20B illustrated in FIGS. 16A to 17. This configuration may be regarded as a configuration in which the folded portion 32 is made to function as the attachment sheet portion arranged on the side of the outer circumference of the guide member 60 and the connecting port 23B itself is formed of the sheet material to which the attachment sheet portion is welded.

Figure 18A:
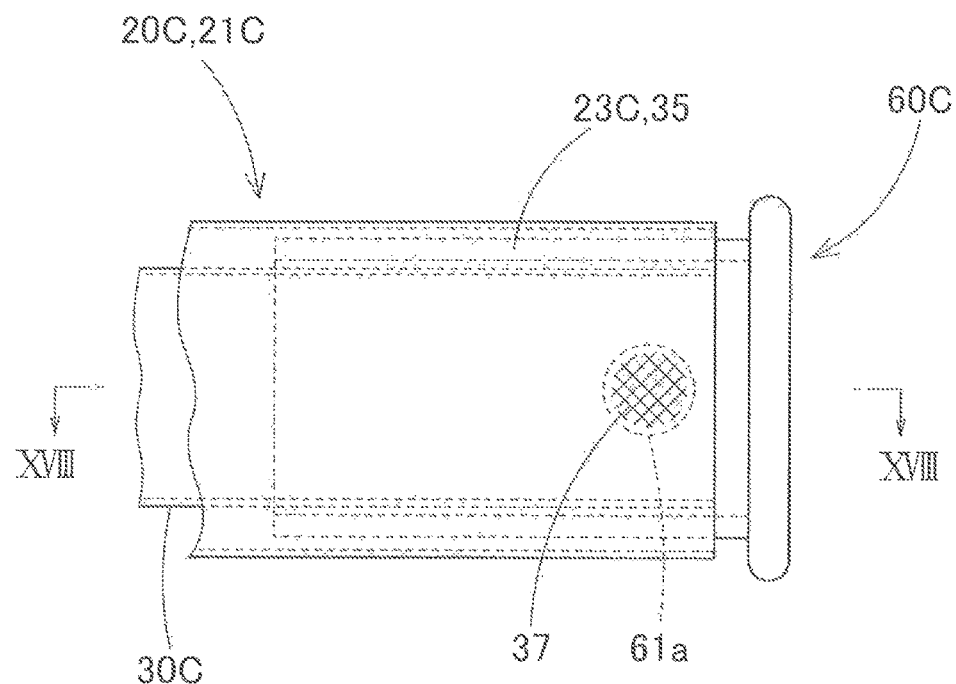
FIG. 18A is a front view of a vicinity of a connecting port of an airbag according to a further alternative embodiment.
Figure 18B:
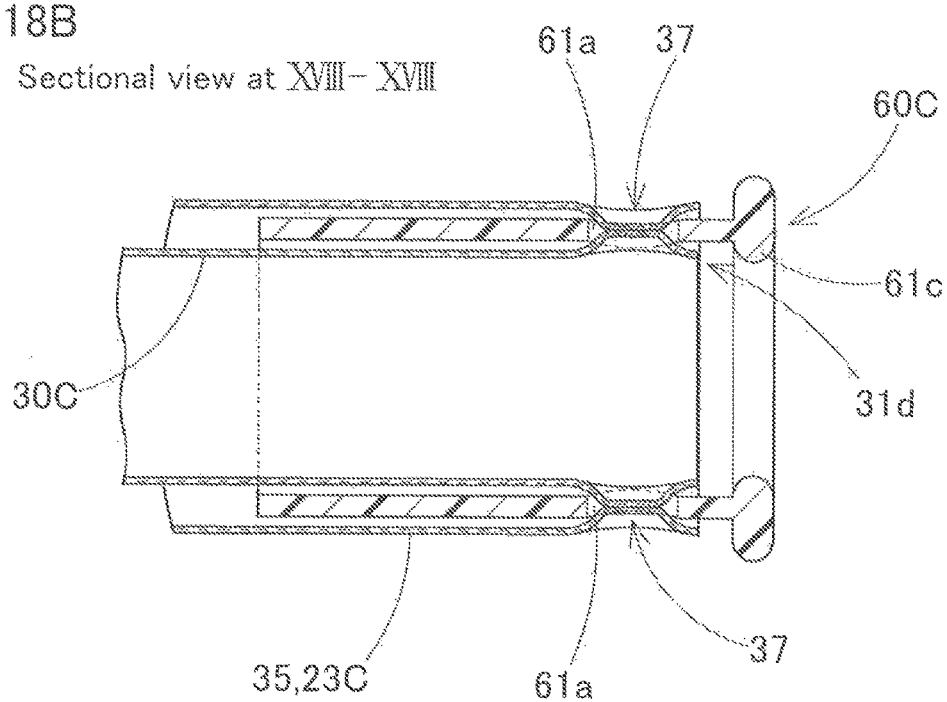
FIG. 18B is a sectional view of the vicinity of the connecting port of the airbag of FIG. 18A.

Furthermore, another configuration may also be employed in which a substantially cylindrical attachment sheet portion 30C with no folded portion 32 is provided on the side of an inner circumference of a connecting port 23C of an air bag main body 21C, and the welded portion 37 is formed by mutually welding the connecting port 23C and an attachment sheet portion 30C, which face each other, at the attachment holes 61a of the guide member 60C as in the air bag 20O illustrated in FIGS. 18A and 18B.

With such a configuration, a brim portion 61c may be provided at the guide member 60C on the side of the end of the opening 24a of the connecting port 23C such that the terminal 31d of the attachment sheet portion 30C is not turned up when the inflator 13 is inserted. It is a matter of course that the brim portion 61c may not be provided if the terminal 31d is not easily turned up.

Figure 19A:
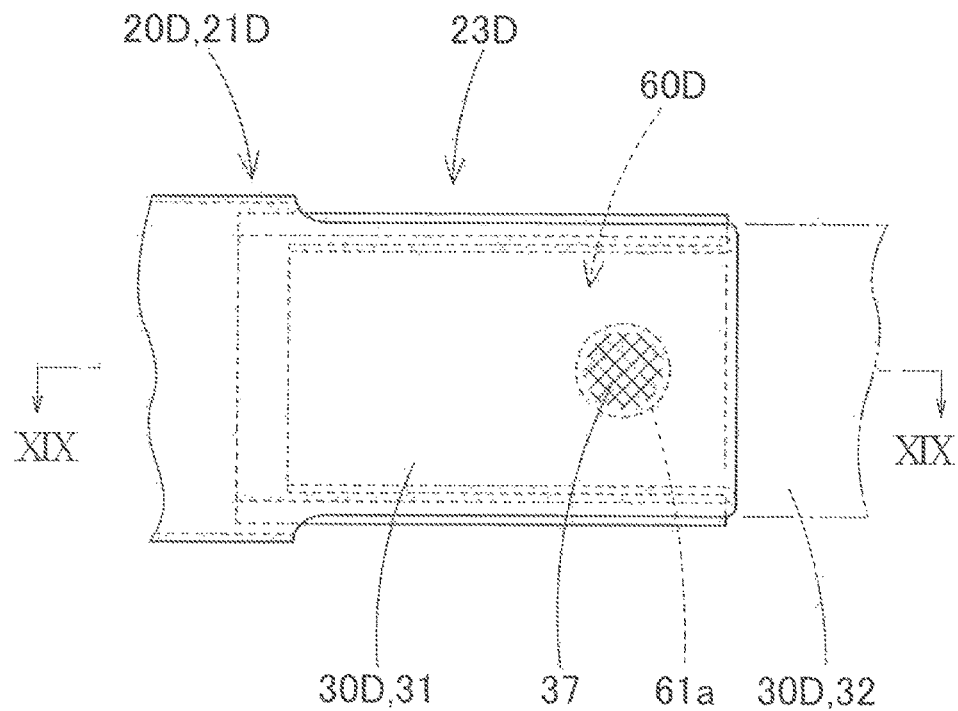
FIG. 19A is a front view of a vicinity of a connecting port of an airbag according to a further alternative embodiment.
Figure 19B:
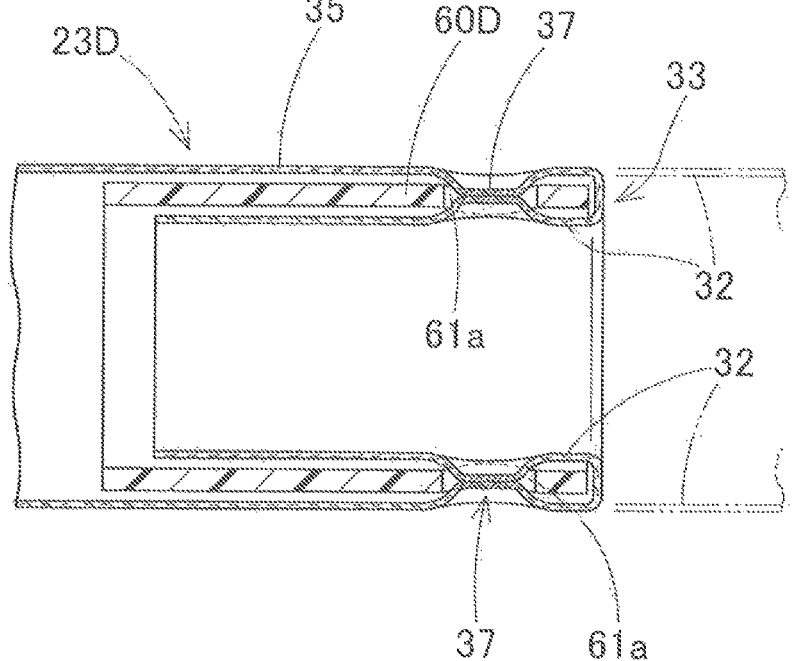
FIG. 19B is a sectional view of the vicinity of the connecting port of the airbag of FIG. 19A.

Furthermore, another configuration may also be employed in which the guide member 60D is arranged on the side of an inner circumferential surface of a connecting port 23D of an air bag main body 21D, the connecting port 23D itself is shared with the main body portion 31 of an attachment sheet portion 30D, the folded portion 32 is arranged on the side of the inner circumferential surface of the guide member 60D, and the welded portion 37 is formed by mutually welding the connecting port 23D and the folded portion 32, which face each other, at the attachment holes 61a as in an air bag 20D illustrated in FIGS. 19A and 19B. This configuration can also be regarded as a configuration in which the folded portion 32 is made to function as the attachment sheet portion arranged on the side of the inner circumference of the guide member 60 and the connecting port 23D itself is formed of a sheet material to which the attachment sheet portion is welded.

Figure 20:
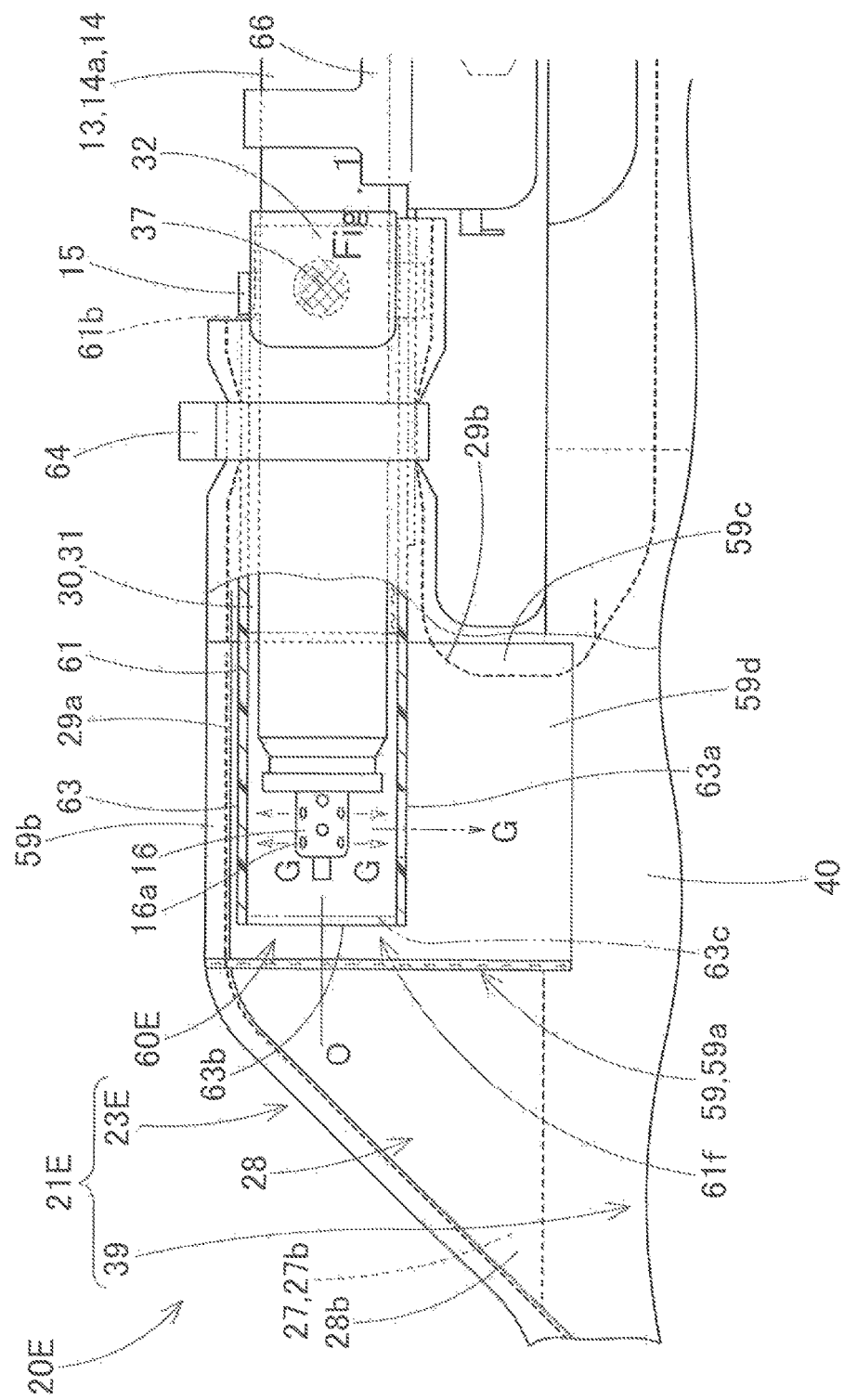
FIG. 20 is a vertical sectional view schematically illustrating the vicinity of a connecting port of an air bag according to still another embodiment.
Figure 21:
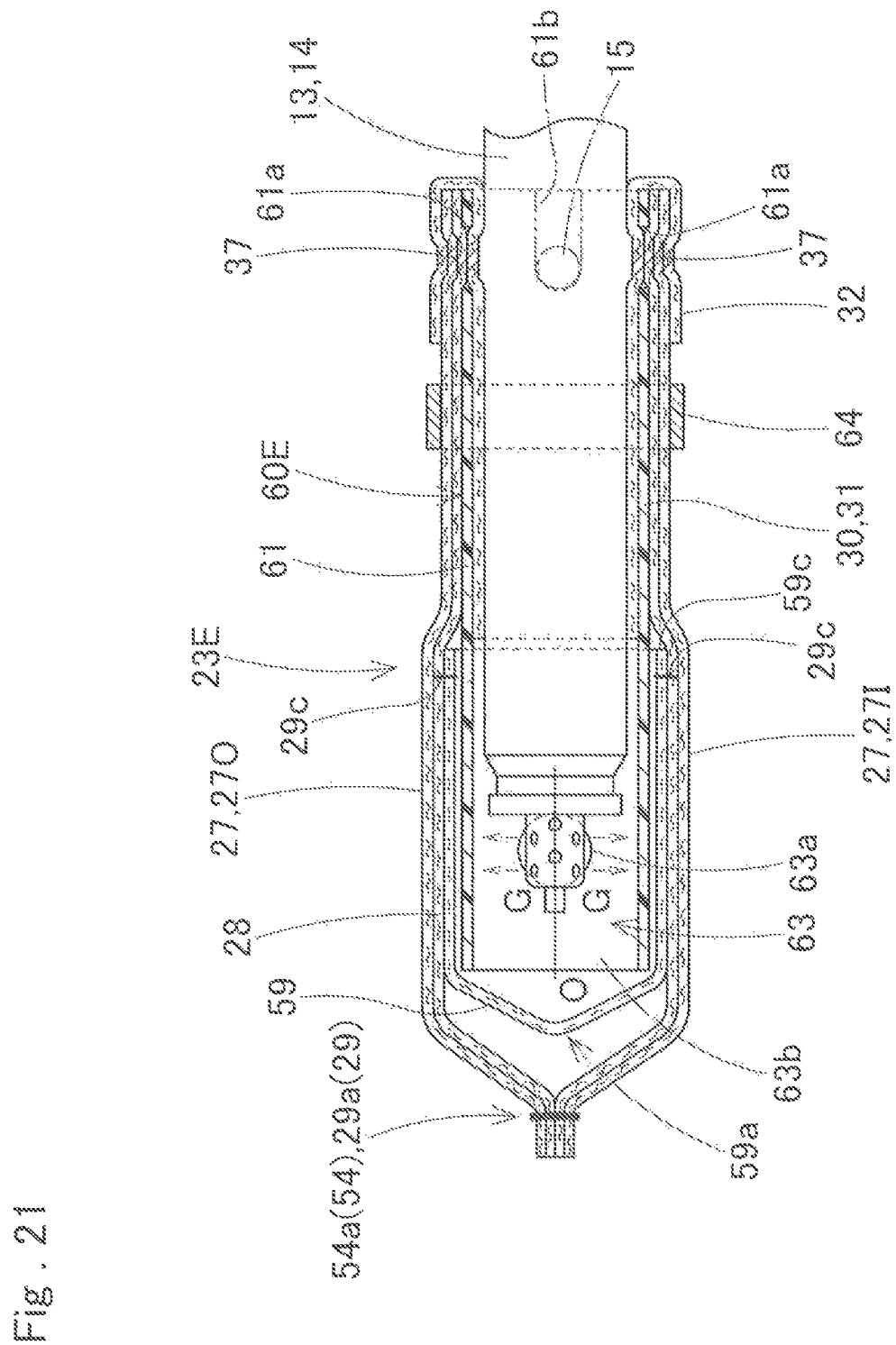
FIG. 21 is a horizontal sectional view schematically illustrating the vicinity of the connecting port illustrated in FIG. 20.

Furthermore, another configuration may also be employed in which a guide member 60E includes the cover portion 63 by extending the front edge 61f of the cylindrical tubular portion 61 toward the front side so as to cover the circumference of the gas outlet port 16a of the inflator 13 as in an air bag 20E illustrated in FIGS. 20 and 21. A discharge hole 63a that restricts the discharge direction toward the side of an air bag main body 21E and discharges the expansion gas G in the lower direction is formed on the lower side in the vicinity of the front edge 61f in the cover portion 63. In addition, a circular opening 63b is formed in an end surface of the guide member 60E on the side of the front edge 61f.

The expansion gas G ejected from the plurality of gas outlet ports 16a is radially ejected from the axial center (coaxial with the axial direction O) of the gas ejecting portion 16 as a center, is then blocked by the cover portion 63, and is made to flow in the lower direction from the discharge hole 63a.

Although the expansion gas G is also discharged from the opening 63b at the front edge 61f of the guide member 60E, a reinforcing cloth 59 made of the same sheet material as that of the inner cloth 28 or the like is disposed at the part in the case illustrated in the drawing to prevent the expansion gas G from being brought into direct contact with the inner cloth 28 of a connecting port 23E. The reinforcing cloth 59 is arranged at a position deviated from the attachment sheet portion 30 toward the front side on the side of the inner circumference of the inner cloth 28 and is folded into two parts on the rear side so as to cover the guide member 60E while a folding line 59a along the upper-lower direction is arranged in the vicinity of the opening 63b, and is sutured with the inner cloth 28 by the sutured portion 29c so as not to be turned up when the guide member 60E is inserted. Furthermore, the reinforcing cloth 59 is disposed by sewing the upper edge 59b and the lower edge 59c with the sutured portions 29a and 29b. The side of the lower edge 59d of the reinforcing cloth 59 extends to the vicinity of the supply path portion 40 and is opened.

According to the air bag 20E, the guide member 60E can restrict the expansion gas G ejected from the gas outlet ports 16a of the inflator 13 so as to be discharged in the discharge direction in the predetermined lower direction by using the discharge hole 63a inside the connecting port 23E of the air bag main body 21E. That is, the guide member 60E can prevent a situation in which the expansion gas G from the inflator 13 is directly sprayed to the part (the part corresponding to the inner cloth 29) that affects the heat resistance in the connecting port 23 and can enhance the heat resistance of the connecting port 23E.

The attachment sheet portion 30 of the air bag 20E is not provided with the sutured portion 34, and the guide member 60E is disposed at the connecting port 23E when the guide member 60E is disposed. That is, the guide member 60E is inserted into the connecting port 23E with the reinforcing cloth 59 disposed therein from the side of the opening 63*b* first, the main body portion 31 of the attachment sheet portion 30 is then inserted into the guide member 60E, the folded portions 32 and 32 are folded, the welded portion 37 is formed by welding four overlapped portions, namely the folded portion 32, the outer cloth 27, the inner cloth 28, and the main body portion 31 by using the attachment holes 61*a*, and the guide member 60E is attached to the connecting port 23E along with the attachment sheet portion 30.

Although the circular opening 63*b* is provided in the end surface of the guide member 60E on the side of the front edge 61*f* in the case illustrated in the drawings, the cover portion 63 may be formed by providing a bottom wall portion 63*c* (see the two-dotted chain line in FIG. 20) so as to cover the part corresponding to the opening 63*b*.

Although the head protecting air bag devices S and SA were exemplified in the embodiments, the invention can be performed as long as the air bag has a configuration of inserting a cylinder-type inflator into the connecting port as the configuration in which the cylindrical connecting port projects from the expansion portion. For example, the invention may be applied to a pedestrian protecting air bag or the like instead of the curtain air bag.

The connecting port of the air bag according to the invention may be configured to simply linearly project from the expansion portion.

Furthermore, although the reinforcing cloth is not provided in the connecting ports 23, 23B, 23C, and 23D of the air bag main bodies 21, 21B, 21C, and 21D and in the vicinities thereof in the respective embodiments, a reinforcing cloth 59 as illustrated in FIGS. 20 and 21 may be separately disposed in the connecting ports 23, 23B, 23C, and 23D and in the vicinities thereof in order to enhance the heat resistance against the expansion gas G ejected from the gas outlet ports 16*a*.

Furthermore, the guide members 60, 60C, 60D, and 60E may be formed of synthesized resin such as TPO or may be formed of metal, rubber, or the like as long as the guide members 60, 60C, 60D, and 60E have such a shape holding property that the opening shape of the opening 24*a* of the connecting ports 23, 23B, 23C, 23D, and 23E can be maintained so as to be able to insert the inflator 13 thereinto. In addition, the guide members 60, 60C, 60D, and 60E made of metal such as a plate metal can provide satisfactory heat resistance.

What is claimed is:

1. An air bag that is connected to an inflator provided with a gas outlet port for ejecting expansion gas on a tip end side, the air bag comprising:
    an air bag main body that is formed of a sheet material with flexibility so as to be able to be folded; and
    a guide member that has a shape holding property,
    wherein the air bag main body includes
        an expansion portion that expands with expansion gas flowing from the inflator, and
        a tubular connecting port, which is connected to the inflator by inserting a side of a gas outlet port of the inflator thereinto, to cause the expansion gas to flow into the expansion portion, and
    wherein the guide member is attached to the connecting port of the air bag main body and maintains an opening state of the connecting port so as to be able to guide the insertion of the side of the gas outlet port of the inflator,
    wherein the guide member includes an attachment hole that penetrates through inner and outer circumferences of the guide member,
    wherein the connecting port of the air bag main body includes an attachment sheet portion that covers the attachment hole and a circumferential edge of the attachment hole on an outer circumferential side or an inner circumferential side of the guide member,
    wherein the attachment sheet portion faces the sheet material constituting the connecting port of the air bag main body across the attachment hole;
    wherein the air bag includes a welded portion that welds the attachment sheet portion and the sheet material constituting the connecting port together at the location of the attachment hole; and
    wherein the guide member is attached to the connecting port with the welded portion.

2. The air bag according to claim 1,
    wherein the guide member is formed into a tubular shape.

3. The air bag according to claim 1,
    wherein a plurality of attachment holes are formed in the guide member such that a plurality of welded portions are disposed around an axial center of the guide member so as to be separate from each other.

4. The air bag according to claim 1,
    wherein the attachment sheet portion is disposed with a folded portion provided on a side of an opening end of the connecting port so as to cover the inner circumferential side and the outer circumferential side of the guide member, and
    wherein the welded portion couples portions of the guide member on the inner circumferential side and the outer circumferential side at the attachment sheet portion.

5. The air bag according to claim 1,
    wherein the guide member includes a position restriction portion that restricts a position of an inflator positioning portion when the inflator is inserted into the connecting port and defines an insertion position of the inflator.

6. The air bag according to claim 1,
    wherein the guide member includes
        a cover portion that covers a circumference of the gas outlet port of the inflator, and
        a discharge hole that is disposed in the cover portion so as to be able to discharge the expansion gas while restricting a discharge direction toward a side of the air bag main body.

7. An air bag that is connected to an inflator provided with a gas outlet port for ejecting expansion gas on a tip end side, the air bag comprising:
    an air bag main body that is formed of a sheet material with flexibility so as to be able to be folded; and
    a guide member that has a shape holding property,
    wherein the air bag main body includes
        an expansion portion that expands with expansion gas flowing from the inflator, and
        a tubular connecting port, which is connected to the inflator by inserting a side of a gas outlet port of the inflator thereinto, to cause the expansion gas to flow into the expansion portion, and
    wherein the guide member is attached to the connecting port of the air bag main body and maintains an opening state of the connecting port so as to be able to guide the insertion of the side of the gas outlet port of the inflator,
    wherein a bracket to be attached on a side of a vehicle body is assembled with the guide member,
    the guide member includes an assembled recessed portion, and
    the bracket includes an elongated assembled portion that outwardly projects from the bracket and that extends into, and mates with, the assembled recessed portion of the guide member to assemble the bracket with the guide member.

8. An air bag that is connected to an inflator provided with a gas outlet port for ejecting expansion gas on a tip end side, the air bag comprising:
an air bag main body that is formed of a sheet material with flexibility so as to be able to be folded; and
a guide member that has a shape holding property,
wherein the air bag main body includes
an expansion portion that expands with expansion gas flowing from the inflator, and
a tubular connecting port, which is connected to the inflator by inserting a side of a gas outlet port of the inflator thereinto, to cause the expansion gas to flow into the expansion portion,
wherein the guide member is attached to the connecting port of the air bag main body and maintains an opening state of the connecting port so as to be able to guide the insertion of the side of the gas outlet port of the inflator,
wherein the connecting port of the air bag main body includes an attachment sheet portion that is disposed on an either outer or inner circumferential side of the guide member, which side is opposite to the side that the sheet material forming the connecting port of the air bag main body is disposed, such that the guide member is disposed between the attachment sheet portion and the sheet material forming the connecting port; and
wherein the attachment sheet portion and the sheet material forming the connecting port are coupled together in order to attach the guide member to the connecting port without deviation in position.

9. The air bag according to claim 8, wherein:
the guide member includes an attachment hole that penetrates through inner and outer circumferences such that the attachment sheet portion and the sheet material forming the connecting port face each other across the attachment hole; and
the attachment sheet portion and the sheet material forming the connecting port are coupled together at the location of the attachment hole.

10. The air bag according to claim 9, wherein the attachment sheet portion and the sheet material forming the connecting port are coupled together by welding.

11. The air bag according to claim 8, wherein the attachment sheet portion includes a folded portion which is folded back at an opening end of the connecting port so as to cover the inner circumferential side and the outer circumferential side of the guide member.

12. The air bag according to claim 8, wherein a bracket to be attached on a side of a vehicle body is assembled with the guide member.

13. The air bag according to claim 12, wherein the bracket includes a holding portion that is able to hold the inflator as inserted into the connecting port.

14. The air bag according to claim 12, wherein:
a clamp is assembled with the outer circumferential side of the connecting port, and
the clamp fastens the connecting port around an outer circumferential surface of a vicinity of the gas outlet port of the inflator as inserted into the connecting port.

* * * * *